US012671813B1

(12) United States Patent
Lee et al.

(10) Patent No.: US 12,671,813 B1
(45) Date of Patent: Jun. 30, 2026

(54) GRID-BASED QUANTIZATION-AWARE COMPRESSION FOR HIGH DYNAMIC RANGE IMAGES

(71) Applicant: Ambarella International LP, Santa Clara, CA (US)

(72) Inventors: Chih-Chun Lee, Hsinchu City (TW); Chi Hong Ju, Saratoga, CA (US); Pei-Chen Lin, Tainan City (TW); Pei-Chien Yu, Taipei City (TW)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 19/054,948

(22) Filed: Feb. 17, 2025

(51) Int. Cl.
*H04N 19/124* (2014.01)
*H04N 19/182* (2014.01)
*H04N 19/184* (2014.01)
*H04N 19/42* (2014.01)

(52) U.S. Cl.
CPC ......... *H04N 19/124* (2014.11); *H04N 19/182* (2014.11); *H04N 19/184* (2014.11); *H04N 19/42* (2014.11)

(58) Field of Classification Search
CPC ........ H04N 23/71; H04N 23/73; H04N 1/387; H04N 1/6052; H04N 17/002; H04N 23/61; H04N 23/698; H04N 23/72; H04N 23/90
USPC ....................................... 375/240
See application file for complete search history.

(56) References Cited

U.S. PATENT DOCUMENTS

| | | | | |
|---|---|---|---|---|
| 10,419,734 B1* | 9/2019 | Lee | ...................... | H04N 17/002 |
| 2012/0081577 A1* | 4/2012 | Cote | ...................... | H04N 19/80 |
| | | | | 348/E5.024 |
| 2017/0374254 A1* | 12/2017 | Miyazaki | ............... | H04N 23/73 |
| 2019/0364189 A1* | 11/2019 | Miyazaki | ............. | H04N 25/772 |

FOREIGN PATENT DOCUMENTS

| | | | | | |
|---|---|---|---|---|---|
| CN | 107949850 A | * | 4/2018 | ........... | G06V 10/462 |
| WO | WO-2019188390 A1 | * | 10/2019 | ............. | H04N 23/61 |

* cited by examiner

*Primary Examiner* — Masum Billah
(74) *Attorney, Agent, or Firm* — Maiorana Patent Law, PA

(57) ABSTRACT

An apparatus comprising an interface and a processor. The processor may be configured to determine a grid size for a compression operation in response to a source bit-depth and a compressed bit-depth, divide the image frames into grids in response to the grid size, analyze the pixel data for each of the grids to determine a gain and an offset for the grids, process the grids in response to the gain and the offset, calculate a value at the compressed bit-depth for each of the pixel data, store compression parameters in an image header, and generate a compressed image frame comprising the image header and the values for the pixel data at the compressed bit-depth. The compression parameters may comprise a table of the gain and offset for each of the grids. The compression operation may convert the pixel data from the source bit-depth to the compressed bit-depth.

20 Claims, 14 Drawing Sheets

200

GRID-BASED QUANTIZATION-AWARE COMPRESSION FOR HIGH DYNAMIC RANGE IMAGES

FIELD OF THE INVENTION

The invention relates to image compression generally and, more particularly, to a method and/or apparatus for implementing a grid-based quantization-aware compression for high dynamic range images.

BACKGROUND

Multimedia content makes up a substantial amount of digital content. With advanced edge devices, such as smartphones, end users are generating more and more digital content. High quality digital content, such as images and video, has a relatively large file size. Various compression technology exists in order to aid in the storage of multimedia content.

High Dynamic Range (HDR) is a common image acquisition technology that enhances contrast, brightness, and color range in fields like photography, videography, and gaming. HDR allows for more vivid colors, deeper blacks, and brighter highlights, providing a more lifelike and immersive visual experience compared to standard dynamic range (SDR) technology. In terms of quality, HDR outperforms SDR particularly with extremely dark and extremely bright scenes. The additional quality comes at a cost of hardware complexity and storage capacity.

HDR raw images are represented with large bit-depths. Bit-depths for HDR raw images can be 20 bits or greater. The bit-depth refers to the number of bits used to represent the color information of each pixel. High bit-depth image files, such as 20-bits or higher, can store significantly more color and brightness information compared to 8-bits. The additional bits provide data that is used to display smoother gradients, reduced color banding, more accurate colors, more realistic colors, etc. However, file sizes of high bit-depth raw images are drastically increased over the SDR image files, which adds more cost for both storage and transmission. Additionally, computation involved in processing high bit-depth raw images is resource-intensive and time-consuming. The compression of high bit-depth data that retains the fidelity of HDR raw images is critically important for deployment of HDR technology in multimedia applications.

Conventional storage and transmission of HDR image files requires advanced hardware (i.e., high capacity and high performance), which is often expensive. Compression can reduce the amount of storage and/or bandwidth used for HDR images. However, compression can be resource intensive and/or time-consuming. There are two common conventional methods for compressing HDR images (i.e., linear compression and global gamma compression). Both linear compression and global gamma compression result in significant loss of the original data after decompression. Compressing high bit-depth HDR data effectively is of critical important to reduce hardware demands, save costs, and improve efficiency.

It would be desirable to implement a grid-based quantization-aware compression for high dynamic range images.

SUMMARY

The invention concerns an apparatus comprising an interface and a processor. The interface may be configured to receive pixel data arranged as image frames. The processor may be configured to determine a grid size for a compression operation in response to a source bit-depth and a compressed bit-depth, divide the image frames into a plurality of grids in response to the grid size, analyze a statistical distribution of the pixel data for each of the grids to determine a gain parameter and an offset parameter for each of the grids, selectively apply processing to each of the grids of the image frames in response to the gain parameter and the offset parameter, calculate a value at the compressed bit-depth for each of the pixel data in the grid, store compression parameters in an image header, and generate a compressed image frame comprising the image header and the values for the pixel data at the compressed bit-depth. The compression parameters may comprise the grid size, the source bit-depth and a table comprising the gain parameter and the offset parameter for each of the grids. The compression operation may generate the compressed image frame by converting the pixel data of the image frames from the source bit-depth to the compressed bit-depth. The compressed bit-depth may be less than the source bit-depth.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
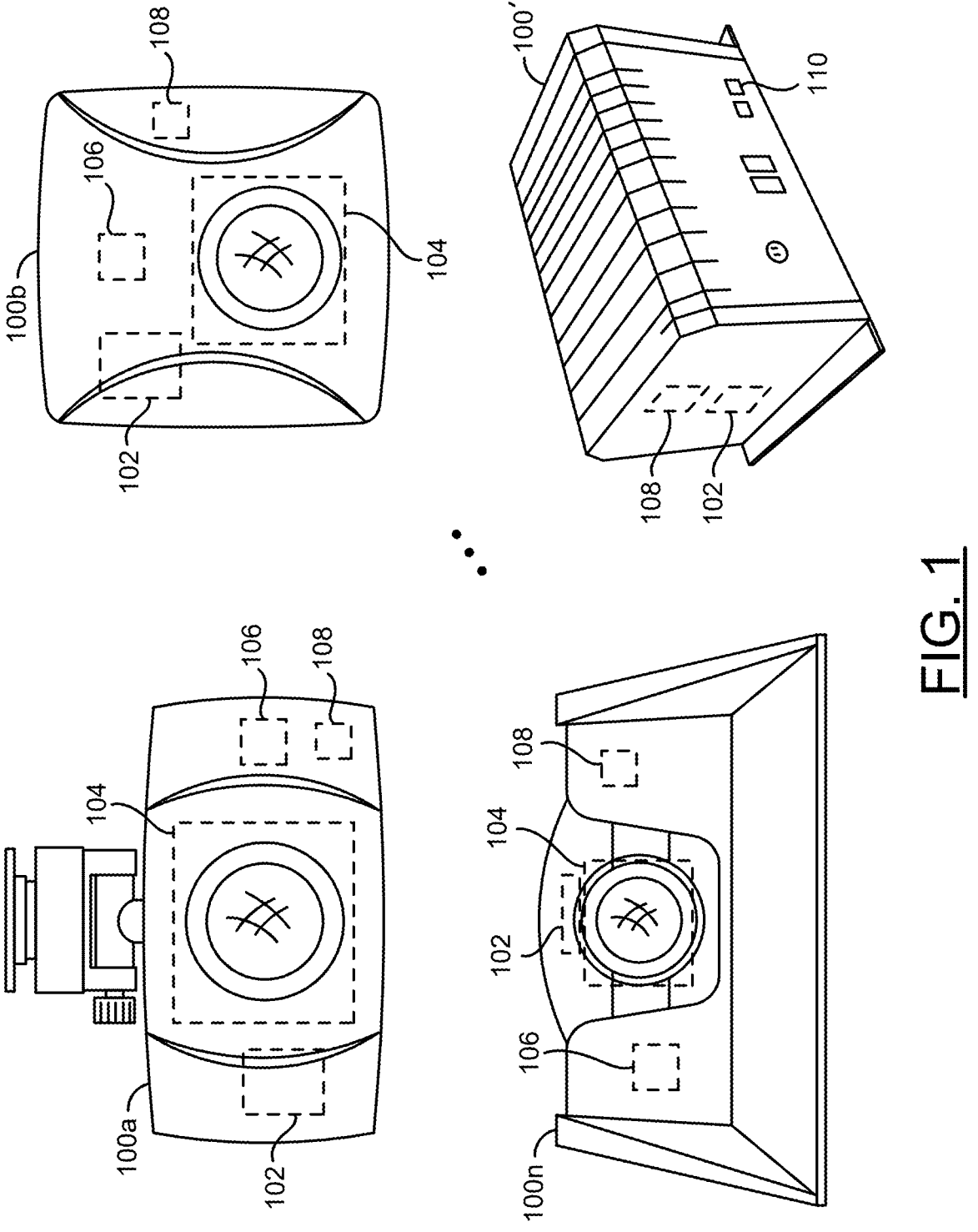
FIG. 1 is a diagram illustrating example edge device cameras and an AI box for implementing a grid-based, quantization-aware compression for high dynamic range images.

Embodiments of the present invention include providing a grid-based quantization-aware compression for high dynamic range images that may (i) compress images from a high bit-depth to a low bit-depth while retaining visual fidelity, (ii) decompress images from a low bit-depth to a source bit-depth, (iii) divide an image into multiple grids and determine compression parameters for each grid, (iv) provide a high compression ratio, (v) determine an appropriate grid size based on a target compressed bit-depth, (vi) reduce redundant image data using gain and offset compensation tailored to specific image regions, (vii) adapt to the content of the image, (viii) operate on edge devices, and/or (ix) be implemented as one or more integrated circuits.

Embodiments of the present invention may be configured to implement a grid-based, quantization-aware compression (GQAC) and/or decompression technique. The GQAC technique may be implemented based on a statistical distribution of pixels values that may derive a suitable presentation of pixels that may convert a high bit-depth representation (e.g., a source bit-depth of the image) with a smaller bit-depth (e.g., a compressed bit-depth for a compressed image). The GQAC technique may be configured to process the pixels at a grid level. Processing the pixels at a grid level may enable a tradeoff between the resultant compression ratio and the overhead of storing compression parameters that may enable decompression. The GQAC technique may achieve a significant amount of data compression while also preserving the integrity of the original raw data after decompression. The GQAC may be effective for applications that may have constraints such as compact storage and/or reliable data recovery.

The GQAC technique may be configured to divide an image into multiple grids. The grids may each represent a local region of the raw image. Each grid may be individually analyzed. A statistical distribution of the pixel data in the grid may be used to determine a number of parameters for compression (e.g., compression parameters). The compression parameters may comprise a grid size, a gain, an offset, bit-depth, etc. Some of the parameters, such as the gain parameter and the offset parameter may be selectively applied to each grid. For example, each grid may have a different gain and offset depending on the statistical distribution of the pixel values in the particular grid. The different compression parameters in each grid may enable the GQAC technique to selectively apply different processing to individual regions of the raw image. Selectively applying processing may enable a high compression ratio. Even after high compression, the GQAC may provide a high image quality. Since the bit-depth, the gain, and the offset may accurately reflect the characteristics of each region of the image for decompression, the resultant images may have minimal data loss.

The GQAC may enable a high compression ratio while maintaining fidelity of the decompressed data. The GQAC may use the statistical distribution of the pixel values to determine a best presentation of pixels to convert the high bit-depth representation of the source image to a smaller bit-depth. The GQAC may process the pixels at a grid level by trading off the resultant compression ratio against computational complexity and/or the overhead of storing the compression parameters that may be used for decompression. The GQAC may be an efficient process that may be implemented in edge devices that have constraints such as compact storage and reliable data recovery.

The compressed images may have a reduced image size (e.g., in bits) compared to the source image. The compression may reduce the image size to enable a low storage capacity for the images and/or a low bandwidth capacity for transmission. The high compression ratio and data retention after decompression may be achieved in response to the grid-based encoding, the small bit-depth, the gain compensation, the offset compensation, the high data retention and/or the high adaptability.

The grid-based encoding may divide the image data into multiple regions (e.g., grids). Compression parameters may be calculated per region (e.g., based on an analysis of the pixel data in the particular region). The compression parameters may comprise the grid size, the bit-depth, a gain value and an offset value. The grid-based encoding may provide region-adaptive processing that enables each region to be treated individually based on the statistics of the pixel data in the region. An appropriate grid size may be calculated. The grid size may be a tradeoff between an overall compression ratio and system complexity and/or overhead used to store the associated information for decompression. Generally, the smaller the width and height settings of the grid, the smaller the loss but the greater the amount of computational complexity.

In some embodiments, the bit-depth may be a pre-determined value. For example, an offline analysis of the HDR pixel distribution may be used to reduce overall system complexity. In some embodiments, a smallest bit-depth may be determined by analyzing the data range of all the pixels in the processing region on the fly. Each region may adopt a minimum number of bits for pixel presentation. In some embodiments, the bit-depth may be a user-selected value.

Gain and offset compensation may be determined. The gain and offset compensation may reduce redundant data in the image. By tailoring gain and offset parameters for different regions (e.g., grids), the gain and offset compensation technique may minimize the amount of data to be stored while preserving critical image details, reduce information loss and/or achieve high compression efficiency. Generally, the greater the precision of the gain (e.g., the number of decimal place accuracy for the gain value), the smaller the amount of loss, but the greater the overhead.

Even with high compression, embodiments of the present invention may maintain high image quality (e.g., a high data retention rate) compared to other compression techniques (e.g., linear compression and global gamma compression). The gain and offset compensation may accurately represent the characteristics of each region, which may allow the decompressed image to closely reconstruct to the original (e.g., minimizing data loss for a lossy compression). For example, the compression may be a lossy compression, but with minimal data loss. Embodiments of the present invention may be highly adaptable. For example, the compression may adjust to the characteristics of the image to determine a suitable setup for compression based on the content of the pixel data. Selecting a suitable setup may prevent over-compression and/or over-expansion (e.g., maximize image quality while maintaining a high compression ratio).

Referring to FIG. 1, a diagram illustrating example edge device cameras and an AI box for implementing a grid-based, quantization-aware compression for high dynamic range images is shown. Devices 100a-100n and a device 100' are shown. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. In another example, security (surveillance) applications and/or location monitoring applications (e.g., trail cameras) may benefit from a large amount of optical zoom. The design, type and/or application performed by the edge devices 100a-100n may be varied according to the design criteria of a particular implementation.

The device 100' may implement a near-edge device. The device 100' may comprise a computer and/or an artificial intelligence box (e.g., an AI box). The AI box 100' may comprise low power technology designed to be deployed at the edge of a network. Generally, the AI box 100' may be implemented with more computational power and/or higher power consumption than the edge devices 100a-100n. For example, the AI box 100' may implement a microprocessor powered using a hard-wire connection, where power consumption is less of a concern. Generally, the AI box 100' may have a similar implementation as the edge devices 100a-100n, but with a higher power budget, a processor capable of more throughput (e.g., with fewer computational constraints), more memory, more storage capacity, a network connection and/or implemented without sensors. In an example, the AI box 100' may be a centralized device for the edge devices 100a-100n that may receive data from the edge devices 100a-100n, and provide data to the edge devices 100a-100n. For example, instead of uploading data to a cloud service, the edge devices 100a-100n may upload to the AI box 100'. The edge devices 100a-100n may offload some computational tasks to the AI box 100'. For example, the edge devices 100a-100n may perform some computational tasks locally (e.g., video processing, object detection, neural network calculations, etc.) and may off-load tasks that may be more computationally intensive to the AI box 100' (e.g., the AI box 100' may be capable of implementing a larger neural network).

The camera systems 100a-100n and/or the AI box 100' may perform the grid-based quantization-aware compression for images. The images may be standard range images and/or high dynamic range images. Each of the camera systems 100a-100n and/or the AI box 100' may be configured to implement the grid-based quantization-aware compression for high dynamic range images.

Each camera device 100a-100n and the AI box 100' may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). In some embodiments, the camera systems 100a-100n may be stationary cameras (e.g., installed and/or mounted at a single location). In some embodiments, the camera systems 100a-100n may be handheld cameras. In some embodiments, the camera systems 100a-100n may be configured to pan across an area, may be attached to a mount, a gimbal, a camera rig, etc. In some embodiments, the AI box 100' may have a low-profile form factor (e.g., approximately 3 inches tall). In some embodiments, the AI box 100' may have a tower design profile. Generally, larger profiles for the AI box 100' may provide more physical space for data storage devices (e.g., hard drives and/or solid-state drives) and/or more room for heat dissipation. The design/style of the cameras 100a-100n and/or the AI box 100' may be varied according to the design criteria of a particular implementation.

Each of the camera systems 100a-100n may comprise a block (or circuit) 102, a block (or circuit) 104, a block (or circuit) 106 and/or a block (or circuit) 108. The circuit 102 may implement a processor. The circuit 104 may implement a capture device. The circuit 106 may implement an inertial measurement unit (IMU). The circuit 108 may implement a memory. The camera systems 100a-100n may comprise other components (not shown).

In some embodiments, the processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IMU 106 may be configured to generate movement data (e.g., vibration information, an amount of camera shake, panning direction, etc.). In some embodiments, a structured light projector may be implemented for projecting a speckle pattern onto the environment. The capture device 104 may capture the pixel data comprising a background image (e.g., the environment) with the speckle pattern. While each of the cameras 100a-100n are shown without implementing a structured light projector, some of the cameras 100a-100n may be implemented with a structured light projector (e.g., cameras that implement a sensor that capture IR light). The memory 108 may be configured to store data. For example, images and/or captured pixel data may be stored by the memory 108. The processor 102 may perform compression operations to store the images without consuming a large amount of the memory 108.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding, electronic image stabilization, compression, decompression and/or video transcoding on-device). For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100*a*-100*n* may operate independently from each other). For example, each of the cameras 100*a*-100*n* may individually analyze the pixel data captured and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera), an image sensor (e.g., a CMOS censor, an RGB sensor, an RGB-IR sensor, etc.), a frame buffer, etc. The image sensor of the capture device 104 may be configured to convert light focused by the lens onto the image sensor into pixel data. The processor 102 may be configured to accelerate preprocessing of the speckle structured light for monocular 3D reconstruction. Monocular 3D reconstruction may be performed to generate depth images and/or disparity images without the use of stereo cameras.

The AI box 100' may comprise the processor 102, the memory 108 and/or a block (or circuit) 110. The processor 102 and the memory 108 may have a similar implementation as the processor and memory implemented by the camera systems 100*a*-100*n*. Generally, the processor 102 may be a more powerful processor (e.g., higher throughput and higher power consumption) and the memory 108 may be higher capacity than the processor and the memory implemented by the camera systems 100*a*-100*n*. The circuit 110 may implement a power supply. The AI box 100' may comprise other components (e.g., hard drives, solid state drives, memory, co-processors, input/output ports, heat sinks, cooling fans, solid-state coolers, etc.). The number, type and/or arrangement of the components of the AI box 100' may be varied according to the design criteria of a particular implementation.

The power supply 110 may be configured to receive power from a power source. For example, the power source may be a power supply from a premises (e.g., the power source at a home, an office, a utility station, etc.). The power supply 110 may convert power from the power source for the processor 102, the memory 108 and/or other components. The power supply 110 may enable the processor 102 to have a consistent power supply. For example, the AI box 100' may be implemented with the power supply 110 instead of or in addition to a battery. The power supply 110 may enable the processor 102 to operate without power constraints that may be imposed on the camera systems 100*a*-100*n* (e.g., due to thermal conditions and/or a limited power budget).

The AI box 100' may perform similar operations as the camera systems 100*a*-100*n* (e.g., computer vision operations such as object/event detection, 3D reconstruction, liveness detection, depth map generation, video encoding, video compression, electronic image stabilization, compression operations, decompression operations and/or video transcoding). The processor 102 of the AI box 100' may be a dedicated neural network processor. For example, the AI box 100' may be specialized and/or optimized to perform neural network calculations (e.g., matrix multiplication, convolution, etc.), deep learning, machine learning applications, voice recognition, etc. For example, the AI box 100' may implement multiple AI models such as vision-language models (e.g., image-to-text AI model and/or a video-to-text AI model) and/or LLMs (e.g., Phi, Gemma, LLaVA-OneVision, Llama, etc.). The AI box 100' may be configured to perform AI operations locally without relying on cloud service and/or internet connectivity. The AI box 100' may offer privacy and/or data security since data may remain on device and/or operate independent of an internet connection. The AI box 100' may provide real-time processing (e.g., reduced latency since data is not communicated out to cloud servers). The design of the AI box 100' may be varied according to the design criteria of a particular implementation.

In some embodiments, the components of the camera systems 100*a*-100*n* and/or the AI box 100' may be implemented as a system on chip (SoC). For example, the camera systems 100*a*-100*n* and/or the AI box 100' may be implemented as a printed circuit board comprising one or more components. The camera systems 100*a*-100*n* and/or the AI box 100' may be configured to perform intelligent video analysis on the video frames of the video. The camera systems 100*a*-100*n* and/or the AI box 100' may be configured to crop and/or enhance the video.

In some embodiments, the processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames. In some embodiments, the processor 102 may be implemented as a dataflow vector processor. In an example, the processor 102 may comprise a highly parallel architecture configured to perform image/ video processing and/or radar signal processing.

The memory 108 may store data. The memory 108 may implement various types of memory including, but not limited to, a cache, flash memory, memory card, random access memory (RAM), dynamic RAM (DRAM), etc. The type and/or size of the memory 108 may be varied according to the design criteria of a particular implementation. The data stored in the memory 108 may correspond to a video file, motion information (e.g., readings from various sensors), video fusion parameters, image stabilization parameters, user inputs, computer vision models, feature sets, radar data cubes, radar detections and/or metadata information. In some embodiments, the memory 108 may store reference images. The reference images may be used for computer vision operations, 3D reconstruction, auto-exposure, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 108. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 108. In an example, the memory 108 may store one or more directed acyclic graphs (DAGs) and one or more sets of weights and biases defining the one or more artificial neural network models. In yet another example, the memory 108 may store instructions to perform transformational operations (e.g., Discrete Cosine Transform, Discrete Fourier Transform, Fast Fourier Transform, etc.). The processor/ SoC 102 may be configured to receive input from and/or present output to the memory 108. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The encoded video frames may be processed locally. In one example, the encoded video may be stored locally by the memory 108 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

In some embodiments, the processor 102 may implement one or more coprocessors, cores and/or chiplets. For example, the processor 102 may implement one coprocessor configured as a general purpose processor and another coprocessor configured as a video processor. In some embodiments, the processor 102 may be a dedicated hardware module designed to perform particular tasks. In an example, the processor 102 may implement an AI accelerator. In another example, the processor 102 may implement a radar processor. In yet another example, the processor 102 may implement a dataflow vector processor. In some embodiments, other processors implemented by the apparatus 100 may be generic processors and/or video processors (e.g., a coprocessor that is physically a different chipset and/or silicon from the processor 102). In one example, the processor 102 may implement an x86-64 instruction set. In another example, the processor 102 may implement an ARM instruction set. In yet another example, the processor 102 may implement a RISC-V instruction set. The number of cores, coprocessors, the design optimization and/or the instruction set implemented by the processor 102 may be varied according to the design criteria of a particular implementation. Details of the components of the camera systems

100a-100n and/or the AI box 100' may be described in association with U.S. application Ser. No. 18/960,324, filed on Nov. 26, 2024, U.S. application Ser. No. 18/583,298, filed on Feb. 11, 2024, U.S. application Ser. No. 18/210,931, filed on Jun. 16, 2023, U.S. application Ser. No. 18/087,916, filed on Dec. 23, 2022, U.S. application Ser. No. 17/943,472, filed on Sep. 13, 2022, U.S. application Ser. No. 17/324,605, filed on May 19, 2021 and/or U.S. application Ser. No. 15/931, 942, filed on May 14, 2020, appropriate portions of which are incorporated by reference.

Figure 2:
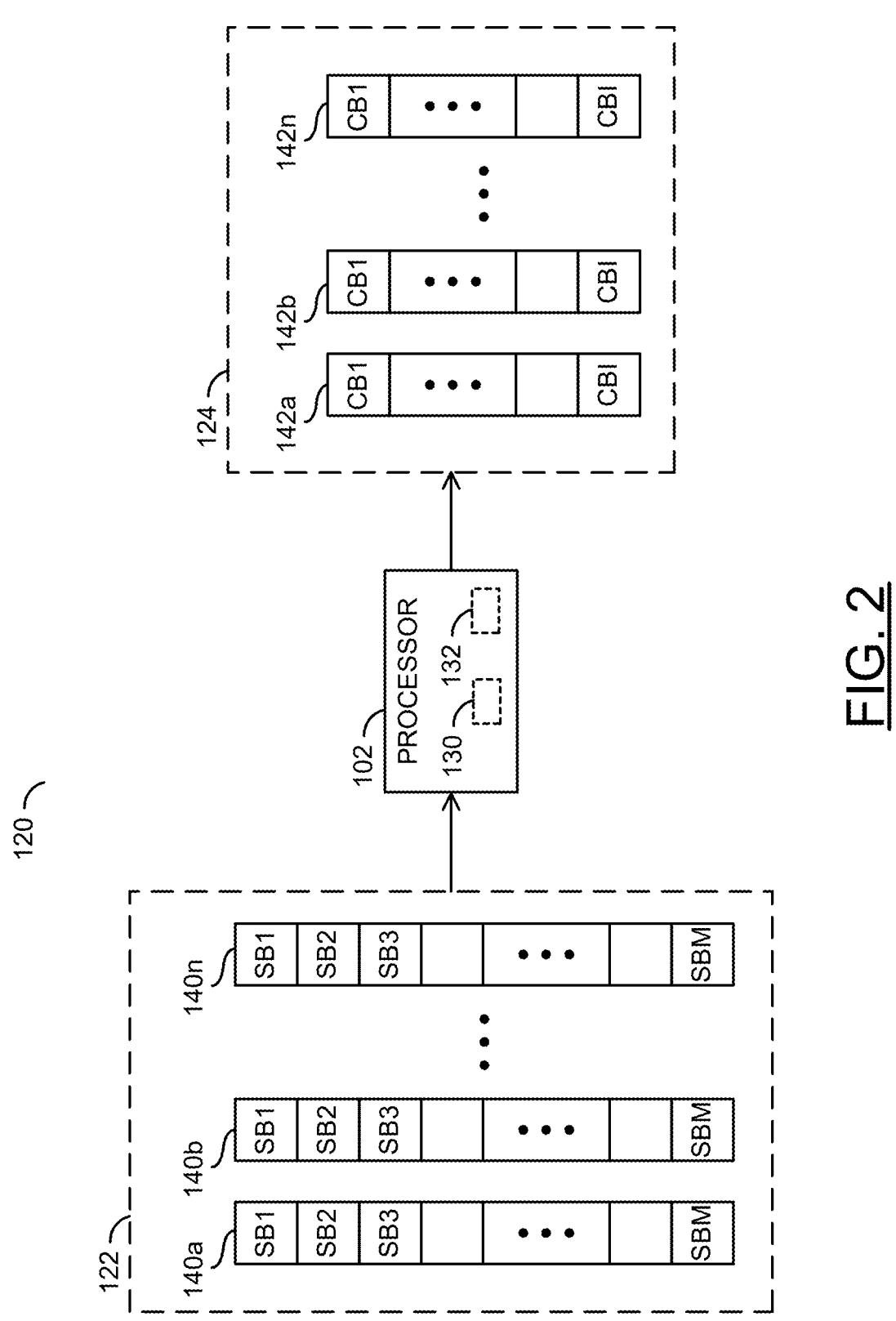
FIG. 2 is a diagram illustrating compression operations for an image.

Referring to FIG. 2, a diagram illustrating compression operations for an image is shown. A compression operation 120 is shown. The compression operation 120 may be performed by the processor 102. For example, the compression operations 120 may be performed locally on the camera systems 100a-100n and/or locally by the AI box 100'. The compression operations 120 may comprise the processor 102, an input image 122 and/or an output image 124.

The processor 102 is shown comprising a block (or circuit) 130 and/or a block (or circuit) 132. The circuit 130 may implement a compression pipeline. The circuit 132 may implement a decompression pipeline. The processor 102 may comprise other components (not shown). The number, type and/or arrangement of the components of the processor 102 may be varied according to the design criteria of a particular implementation.

The input image 122 may be an image, a video frame, a SDR image, an HDR image, etc. Generally, embodiments of the present invention may be described using HDR images as a particular example. However, the compression operation 120 may not be limited to HDR images. Generally, the compression operations 120 may be applied to any images that may be desired to have bit-depth compression and decompression.

The compression pipeline 130 may be configured to perform the compression operation 120. In some embodiments, the compression pipeline 130 may be implemented as software instructions executed by the processor 102. For example, the memory 108 may store the computer executable instructions for the compression operations 120 and the processor 102 may perform the computer executable instructions. In some embodiments, the compression pipeline 130 may be implemented by one or more hardware modules implemented by the processor 102 (e.g., dedicated hardware modules and/or programmable hardware modules). Generally, both a source bit-depth and a compression bit-depth may be known (e.g., received and/or determined based on an analysis of the input image 122) before the compression pipeline 130 performs the compression operations 120. Details of the compression pipeline 130 may be described in association with FIG. 4.

The hardware modules implemented by the processor 102 may be re-configurable. For example, the processor 102 may re-configure the hardware modules to adapt to the particular amount of processing desired for particular operations. For example, the processor 102 may be configured to perform dynamic resource allocation.

The dynamic resource allocation may be configured to allocate and/or schedule various resources of the processor 102 and/or the memory 108. The dynamic resource allocation may be configured to shift resources depending on what aspects may benefit from additional resources. In an example, the dynamic resource allocation may determine an amount of processing time and/or the number of a particular type of operations may be used for a particular type of calculation. In another example, the dynamic resource allocation may determine an amount of capacity of the memory 108 to assign for various tasks. The dynamic resource allocation implemented may be configured to analyze upcoming tasks and/or the types of tasks in order to determine how to allocate available resources.

In an example, the dynamic resource allocation may be configured to assign, reserve and/or allocate compute resources, memory resources, bandwidth, etc. The resources allocated to the compression pipeline 130, the decompression pipeline 132 and/or other operations (e.g., computer vision, AI operations, image preprocessing, etc.) may be determined in response to particular application tasks. In some embodiments, the processor 102 may receive the upcoming applications task and the dynamic resource allocation may determine an appropriate configuration for the hardware modules. The method of determining the upcoming application tasks and/or the amount of resources to allocate for each device may be varied according to the design criteria of a particular implementation.

The input image 122 may comprise pixel data 140a-140n. The pixel data 140a-140n may be arranged as an image and/or a video frame. The pixel data 140a-140n may comprise pixel values. The pixel values may be used to represent the image data of the input image 122. For example, the pixel values of the input image 122 may be processed and/or decoded to enable a display of the image content of the input image 122. The amount of the pixel data 140a-140n implemented for the input image 122 may be varied based on the resolution of the input image 122. For example, the higher the resolution, the greater the number of the pixel data 140a-140n may be part of the input image 122. In an example, if the input image 122 has a resolution of 1920×1080, the number of the pixel data 140a-140n may be 2,073,600. The number of the pixel data 140a-140n may be varied according to the design criteria of a particular implementation.

Each of the pixel data 140a-140n may have a pixel value at a particular bit-depth. Each of the pixel data 140a-140n are shown having bits SB1-SBM (e.g., each pixel value may be represented by M bits). The M bits may be the bit-depth of the pixel data 140a-140n. The bits SB1-SBM may be a source bit-depth of the input image 122 (e.g., the source image for the compression operations performed by the compression pipeline 130). In the example shown, the pixel data 140a-140n may have a source bit-depth of M bits.

The bit-depth may be a number of bits used to represent the color and/or intensity of each pixel in a digital image (e.g., the input image 122). The bit-depth may define a range of possible pixel values that can be assigned to each of the pixel data 140a-140n. The bit-depth may affect a color precision of the input image 122. The bit-depth may affect a file size of the input image 122. Generally, a higher bit-depth may enable more color information per pixel, resulting in more accurate color representation and larger file sizes. In an example, HDR images may have a high bit-depth compared to standard images. The higher bit-depth of the HDR images may provide a wider range of luminance values. In one example, the bit-depth of the input image 122 may be in a HDR10 format (e.g., 10-bit per color channel). In another example, the bit-depth of the input image 122 may be in a 12-bit format, a 16-bit format, a 20-bit format, etc. In yet another example, the bit-depth of the input image 122 may be in a 32-bit format (e.g., true HDR using floating-point numbers to represent an unlimited range of values). The particular source bit-depth for the pixel data 140a-140n may be varied according to the design criteria of a particular implementation.

The processor 102 may be configured to generate the output image 124 in response to the input image 122. For example, the input image 122 may be an uncompressed, raw image. In one example, the input image 122 may be a source HDR image. The processor 102 may perform the compression operations 120 on the source input image 122. For example, the compression pipeline 130 may perform the compression operations to convert the input image 122 to the output image 124. The output image 124 may be a compressed image. For example, the output image 124 may be a version of the input image 122 that has a compressed version of the image data of the input image 122.

The output image 124 may comprise pixel data 142a-142n. The pixel data 142a-142n may be arranged as an image and/or a video frame. The pixel data 142a-142n may comprise pixel values. The pixel values may be used to represent the compressed image data of the output image 124. For example, the pixel values of the output image 124 may be decompressed and/or decoded to enable a display of the image content of the output image 124. The amount of the pixel data 142a-142n implemented for the output image 124 may be the same as the resolution of the input image 122. For example, the higher the resolution of the input image 122, the more of the pixel data 142a-142n may be part of the output image 124. In an example, if the input image 122 has a resolution of 1920×1080, the number of the pixel data 142a-142n of the output image 124 may be 2,073,600. The pixel data 142a-142n may represent the same location of the output image 124 as the pixel data 140a-140n of the input image 122. The number of the pixel data 142a-142n may be varied according to the design criteria of a particular implementation.

The compressed image 124 may be a generated in response to a lossy compression. The lossy compression performed by the compression pipeline 130 may reduce an amount of data used to represent the image data of the input image 122, but with as small amount of data loss as is feasible. The compressed image 124 may comprise the pixel data 142a-142n arranged to provide similar visual content as the input image 122, but with a slight loss in visual quality. The reduction in visual quality may be a tradeoff between file size and visual fidelity.

Each of the pixel data 142a-142n may have a pixel value at a particular bit-depth. The pixel data 142a-142n may be compressed pixel data. Each of the compressed pixel data 142a-142n are shown having bits CB1-CB1 (e.g., each compressed pixel value may be represented by I bits). The I bits may be the bit-depth of the compressed pixel data 142a-142n. The bits CB1-CB1 may be a compressed bit-depth of the output image 124 (e.g., the compressed image generated by the compression operations 120 of the compression pipeline 130). In the example shown, the compressed pixel data 142a-142n may have a compressed bit-depth of I bits.

The compression operations 120 performed by the processor 102 may convert the source image 122 to the compressed image 124. The compression operation 120 performed by the compression pipeline 130 may generate the compressed image frame 124 by converting the pixel data 140a-140n of the input image frame 122 from the source bit-depth of M to the compressed bit-depth I. The compressed bit-depth I may be less than the source bit-depth M. In one example, the source bit-depth M may be 20-bits and the compressed bit-depth I may be 12-bits. In another example, the source bit-depth M may be 16-bits and the compressed bit-depth I may be 8-bits. In yet another example, the source bit-depth M may be 32-bits and the compressed bit-depth I may be 10-bits. The particular change in bit-depth implemented by the compression operations 120 may be varied according to the design criteria of a particular implementation.

Figure 3:
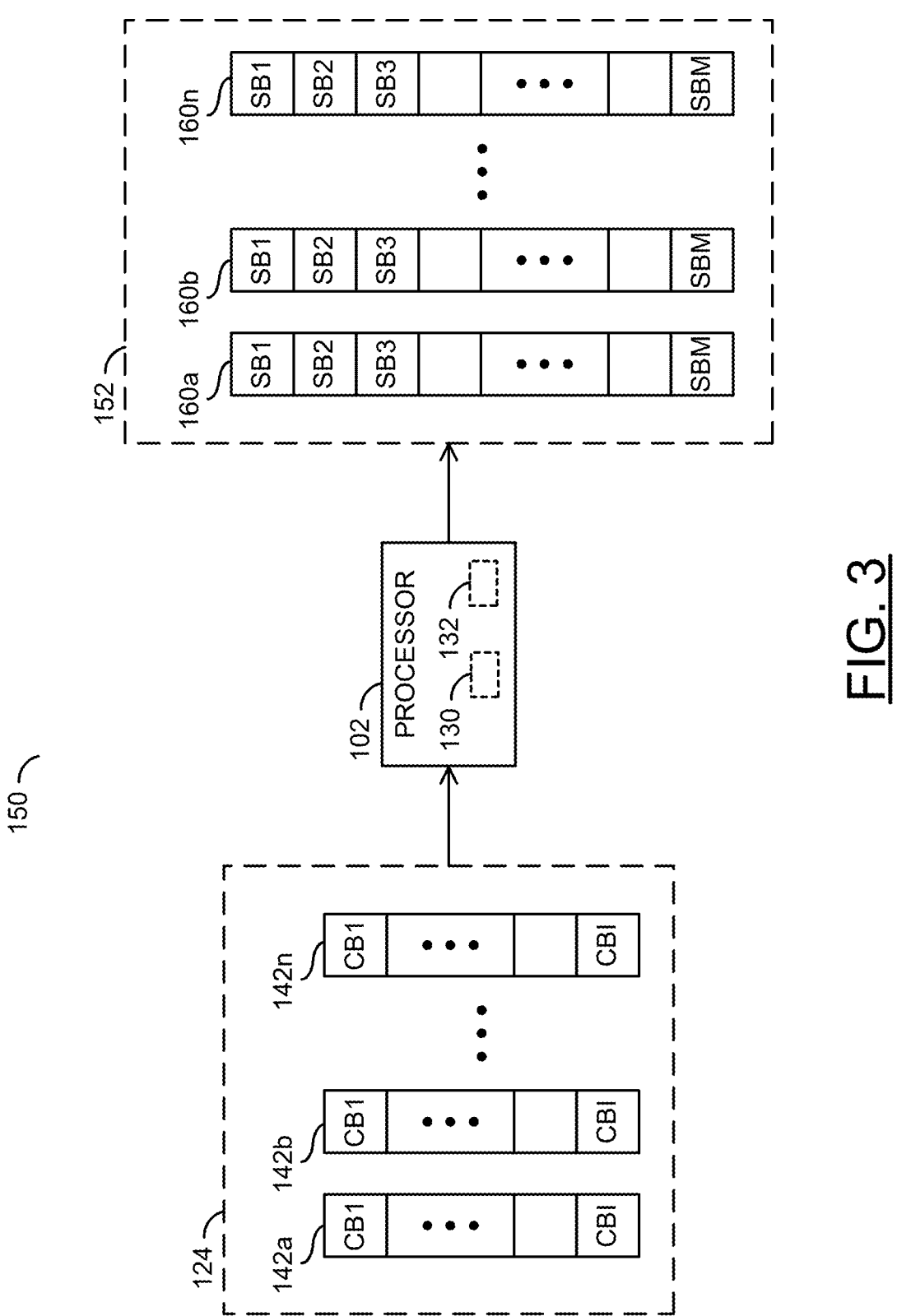
FIG. 3 is a diagram illustrating decompression operations for an image.

Referring to FIG. 3, a diagram illustrating decompression operations for an image is shown. A decompression operation 150 is shown. The decompression operation 150 may be performed by the processor 102. For example, the decompression operations 150 may be performed locally on the camera systems 100a-100n and/or locally by the AI box 100'. The decompression operations 150 may comprise the processor 102, the output image 124 and a decompressed image 152. Similar to the processor 102 shown in association with FIG. 2, the processor 102 is shown implementing the compression pipeline 130 and the decompression pipeline 132.

The compressed image 124 may be similar to the compressed image 124 described in association with FIG. 2. The compressed image 124 may be a compressed version of an image, a compressed version of a video frame, a compressed version of the input image 122 (e.g., an SDR image, a compressed version of an HDR image, etc.). Generally, the decompression operations 150 may be applied to a compressed image that has been compressed using the compression operations 120 shown in association with FIG. 2 in order to generate a decompressed image that has the same bit-depth as the input image 122.

The decompression pipeline 132 may be configured to perform the decompression operation 150. In some embodiments, the decompression pipeline 132 may be implemented as software instructions executed by the processor 102. For example, the memory 108 may store the computer executable instructions for the decompression operations 150 and the processor 102 may perform the computer executable instructions. In some embodiments, the decompression pipeline 132 may be implemented by one or more hardware modules. Generally, both a source bit-depth and a compression bit-depth may be known (e.g., received and/or determined based on an analysis of the input image 122) before the decompression pipeline 132 performs the decompression operations 150. Details of the decompression pipeline 132 may be described in association with FIG. 5.

The hardware modules implemented by the processor 102 may be re-configurable. The hardware modules may be configured to provide various hardware components to implement a video processing pipeline, a radar signal processing pipeline and/or an AI processing pipeline. The hardware modules may be configured to receive the pixel data (e.g., the pixel data 140a-140n and/or the compressed pixel data 142a-142n), generate the video frames from the pixel data, perform various operations on the video frames (e.g., de-warping, rolling shutter correction, cropping, upscaling, image stabilization, 3D reconstruction, liveness detection, auto-exposure, the compression operations 120, the decompression operation 150, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules. The features and/or functionality of the hardware modules may be varied according to the design criteria of a particular implementation. Details of the hardware modules may be described in association with U.S.

patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,463, filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules used to implement the compression pipeline 130 and/or the decompression pipeline 132 may be implemented as dedicated hardware modules. Implementing various functionalities of the processor 102 using the dedicated hardware modules may enable the processor 102 to be highly optimized and/or customized to limit power consumption, reduce heat generation and/or increase processing speed compared to software implementations. The hardware modules may be customizable and/or programmable to implement multiple types of operations. Implementing the dedicated hardware modules may enable the hardware used to perform each type of calculation to be optimized for speed and/or efficiency. For example, the hardware modules may implement a number of relatively simple operations that are used frequently in computer vision operations, compression operations and/or decompression operations that, together, may enable the operations to be performed in real-time. The hardware modules may enable computationally intensive operations (e.g., computer vision operations, video encoding, video transcoding, 3D reconstruction, depth map generation, liveness detection, the compression operation 120, the decompression operation 150, etc.) to be performed locally by the camera systems 100a-100n and/or the AI box 100'.

One of the hardware modules may be configured to perform the virtual aperture imaging. One of the hardware modules may be configured to perform transformation operations (e.g., FFT, DCT, DFT, etc.). The number, type and/or operations performed by the hardware modules may be varied according to the design criteria of a particular implementation.

Each of the hardware modules may implement a processing resource (or hardware resource or hardware engine). The hardware engines may be operational to perform specific processing tasks. In some configurations, the hardware engines may operate in parallel and independent of each other. In other configurations, the hardware engines may operate collectively among each other to perform allocated tasks. One or more of the hardware engines may be homogeneous processing resources (all circuits may have the same capabilities) or heterogeneous processing resources (two or more circuits may have different capabilities).

In the example shown, the compressed image 124 may comprise the compressed pixel data 142a-142n. The compressed pixel data 142a-142n may each comprise bits CB1-CB1. For example, the compressed bit-depth of the compressed pixel data 142a-142n may be I bits.

The processor 102 may be configured to generate the decompressed image 152 in response to the compressed image 124. In one example, the compressed image 124 may be a compressed HDR image. The processor 102 may perform the decompression operations 150 on the compressed input image 124. For example, the decompression pipeline 132 may perform the decompression operations 150 to convert the compressed image 124 to the decompressed image 152.

The decompressed image 152 may be a decompressed version of the compressed image 124. For example, the decompressed image 152 may be a version of the compressed image 124 that has been reconstructed to the source bit-depth M. The decompressed image 152 may be similar to the input (e.g., source) image 122 described in association with FIG. 2. For example, the visual data of the decompressed image 152 may be similar to the visual data of the source image 122 with a small amount of visual quality loss due to the lossy compression.

The decompressed image 152 may comprise pixel data 160a-160n. The pixel data 160a-160n may be arranged as an image and/or a video frame. The pixel data 160a-160n may comprise pixel values. The pixel values may be used to represent the decompressed image data of the decompressed image 152. For example, the pixel values of the decompressed image 152 may be reconstructed and/or decoded to enable a display of the image content of the decompressed image 152. The amount of the pixel data 160a-160n implemented for the decompressed image 152 may be the same as the resolution of the input image 122 and the compressed image 124. For example, the higher the resolution of the input image 122, the more of the decompressed pixel data 160a-160n may be part of the decompressed image 152. In an example, if the input image 122 has a resolution of 1920×1080, the number of the decompressed pixel data 160a-160n of the decompressed image 152 may be 2,073, 600. The pixel data 160a-160n may represent the same location of the decompressed image 152 as the pixel data 140a-140n of the input image 122 and the compressed pixel data 142a-142n of the compressed image 124. The number of the compressed pixel data 160a-160n may be varied according to the design criteria of a particular implementation.

The decompressed image 152 may be a generated in response to a reconstruction after a lossy compression. The lossy compression performed by the compression pipeline 130 may be reversed by the decompression pipeline 132 to restore the decompressed image 152 to be as similar as possible to the source image 122. The decompressed image 152 may comprise the decompressed pixel data 160a-160n arranged to provide similar visual content as the input image 122, but with a slight loss in visual quality.

Each of the decompressed pixel data 160a-160n may have a pixel value at a particular bit-depth. The decompressed pixel data 160a-160n may be reconstructed pixel data. Each of the decompressed pixel data 160a-160n are shown having bits SB1-SBM (e.g., each decompressed pixel value may be represented by M bits). The M bits may be the same bit-depth of the input pixel data 140a-140n. The bits SB1-SBM may be the source bit-depth used for the reconstructed image 152 (e.g., the decompressed image generated by the decompression operations 150 of the decompression pipeline 132). In the example shown, the decompressed pixel data 160a-160n may have the source bit-depth of M bits.

The decompression operations 150 performed by the processor 102 may convert the compressed image 124 to the decompressed image 152. The decompression operation 150 performed by the decompression pipeline 132 may generate the decompressed image frame 152 by converting the compressed pixel data 142a-142n of the compressed image frame 124 from the compressed bit-depth of I to the source bit-depth M. The source bit-depth M may be greater than the compressed bit-depth I.

Figure 4:
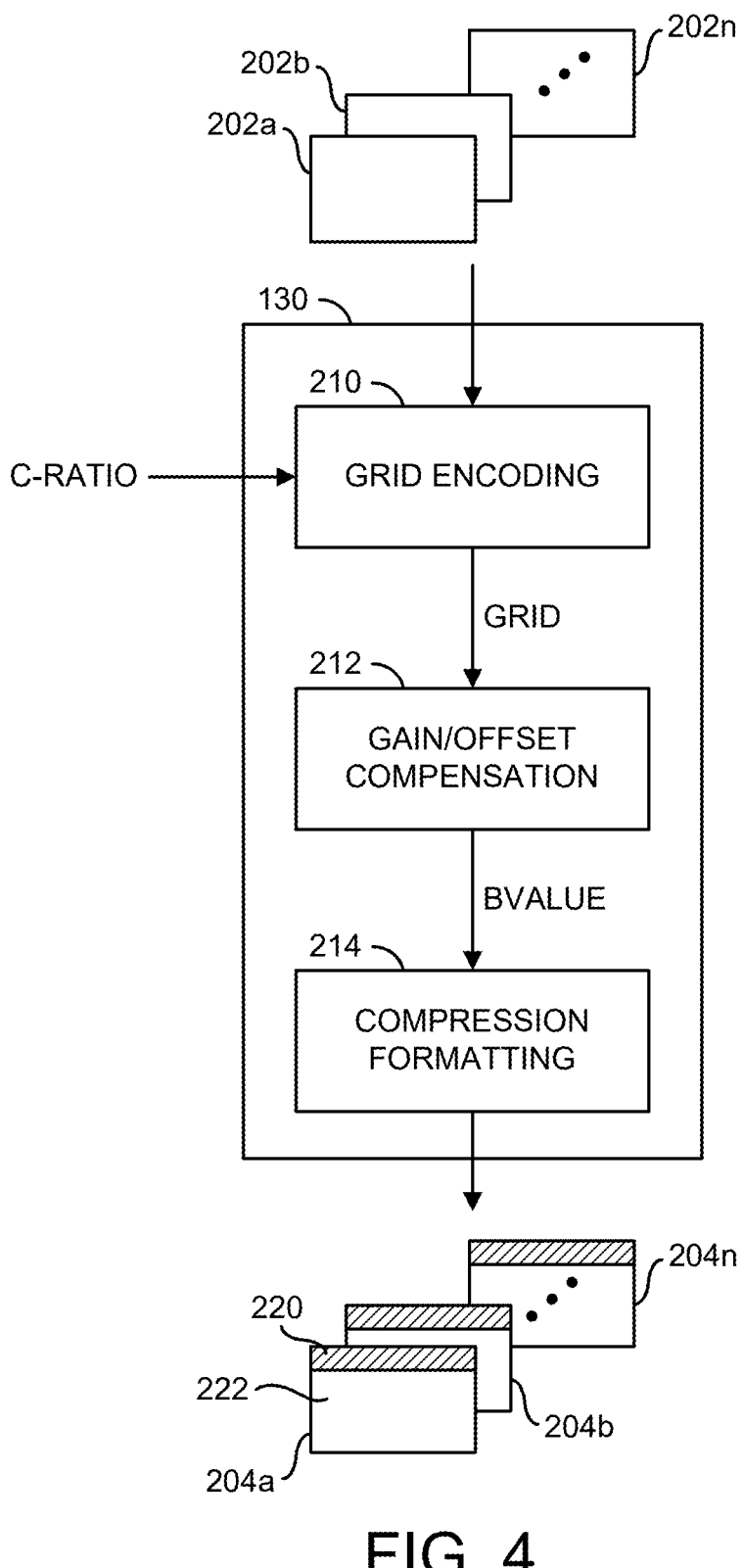
FIG. 4 is a block diagram illustrating components of a compression pipeline of a processor.

Referring to FIG. 4, a block diagram illustrating components of a compression pipeline of a processor is shown. A compression block diagram 200 is shown. The compression block diagram 200 may provide an illustrative example of a portion of the processor 102. The compression block diagram 200 may comprise the compression pipeline 130, video frames 202a-202n and/or video frames 204a-204n. The video frames 202a-202n may be source video frames. The video frames 204a-204n may be compressed video frames.

The compression pipeline 130 may be configured to receive the source video frames 202a-202n and/or a signal C-RATIO. The signal C-RATIO may comprise compression input. The compression input may define various parameters that may be used to determine the amount of compression to perform on the source video frames 204a-204n. In one example, the signal C-RATIO may comprise a compression ratio value. For example, the compression ratio value may be interpreted by the processor 102 to determine particular compression parameters used by the compression pipeline 130 and/or determine the compressed bit-depth I. In another example, the signal C-RATIO may comprise a desired value for the compressed bit-depth (e.g., in response to analyzing the source video frames 202a-202n to determine a source bit-rate and a compressed bit-rate). For example, the processor 102 may analyze the source video frames 202a-202n to determine the bit-rate. In some embodiments, an off-line process may be performed to determine the bit-rate. In one example, the off-line process may be performed by the processor 102 to determine the bit-rate based on available system complexity and/or available system resources (e.g., available storage available in the memory 108). In another example, the off-line process may be performed by a different device (e.g., a cloud computing service). In yet another example, the signal C-RATIO may comprise a target bit-rate and/or a target file size and the processor 102 may determine particular compression parameters used by the compression pipeline 130 and/or determine the compressed bit-depth I. In some embodiments, the signal C-RATIO may provide the source bit-depth M and the compression bit-depth I. In some embodiments, the compression ratio may be a preset value. In some embodiments, the processor 102 may be configured to dynamically adjust the compression ratio. In some embodiments, the signal C-RATIO may be a user input (e.g., a manual selection of the target bit-rate and/or bit-depth). In some embodiments, the signal C-RATIO may provide the bit-rate and/or the compressed bit-depth I in response to analyzing a pixel distribution of the source images 202a-202n. The particular values used for the compression parameters, and/or the method of determining the compression ratio may be varied according to the design criteria of a particular implementation.

The source video frames 202a-202n may comprise pixel values with the source bit-depth M. In an example, each of the source video frames 202a-202n may have a similar implementation as the input image 122 described in association with FIG. 2. In one example, the source video frames 202a-202n may comprise 20-bit HDR video frames. The source video frames 202a-202n may be presented to the input of the compression pipeline 130.

The compression pipeline 130 may comprise a block (or circuit) 210, a block (or circuit) 212 and/or a block (or circuit) 214. The circuit 210 may implement a grid encoding module. The circuit 212 may implement a gain/offset compensation module. The circuit 214 may implement a compression formatting module. The compression pipeline 130 may comprise other components (not shown). The number, type and/or arrangement of the components of the compression pipeline 130 may be varied according to the design criteria of a particular implementation.

The grid encoding module 210 may be configured to receive the source video frames 202a-202n and/or the signal C-RATIO. The grid encoding module 210 may determine the compression ratio for the source video frame 202a-202n. In some embodiments, the signal C-RATIO may provide the preset compression ratio. In some embodiments, the compression ratio may be a pre-programmed value for the grid encoding module 210. In some embodiments, the grid encoding module 210 may be configured to dynamically adjust the compression ratio in response to analyzing the content and/or characteristics of the source video frames 202a-202n. Before performing compression, the grid encoding module 210 may prepare and/or configure one or more compression parameters. The grid encoding module 210 may determine the source bit-depth M and the compression bit-depth I.

Based on the size of the compression bits, the grid encoding module 210 may determine a width and a height of a grid for the source video frames 202a-202n (e.g., a number and location of pixel values to be selectively processed together). The grid may be used to define the regions of the source video frames 202a-202n. The grid may enable region-based compression. The grid size may be one of the compression parameters used by the compression pipeline 130 and/or the decompression pipeline 132. For example, the grid size and/or locations of the pixel values in each of the grids may be used for both the compression operations 120 and the decompression operations 150. In one example, the grid size may be a W×W square region of pixel data. In another example, the grid size may be a H×W rectangular region of pixel data. Details of the grid size and/or the grid regions may be described in association with FIGS. 6-8.

The grid encoding module 210 may be configured to divide each of the source video frames 202a-202n into grids based on the grid size. The grid size may be determined based on the size of the compression bits and/or an amount of computational complexity. For example, computational constraints (e.g., power constraints, heat constraints, battery power, etc.) may result in a larger grid size. In another example, a selection of higher quality and/or less loss of data may result in a smaller grid size. In one example, the grid encoding module 210 may determine that the source video frames 202a-202n are 20-bit HDR images (e.g., source bit-depth of 20-bits) and there may be a predefined bit-depth of 12-bits (e.g., a compressed bit-depth of 12-bits). The grid encoding module 210 may divide the image data into multiple grids with a width of W and a height of H. The grid encoding module 210 may generate a signal (e.g., GRID). The signal GRID may comprise the grid size and/or the grids of pixel data from the source video frames 202a-202n. The signal GRID may be presented to the gain/offset compensation module 212.

The gain/offset compensation module 212 may receive the signal GRID. The gain/offset compensation module 212 may be configured to perform calculations to determine the gain parameter and/or the offset parameter. The gain parameter and the offset parameter may be a portion of the compression parameters used by the compression pipeline 130 and/or the decompression pipeline 132. The gain/offset compensation module 212 may be configured to determine updated pixel values at the compressed bit-depth I for the pixel data in each of the grids. For example, using the source bit-depth M, the compression bit-depth I, and the pixel values in each grid, the gain/offset compensation module 212 may calculate the offset parameter and gain parameter for each grid. The source bit-depth M, the compressed bit-depth I and the pixel values located in each grid may be provided in the signal GRID.

The gain/offset compensation module 212 may calculate the gain parameter and the offset parameter for each grid. In one example, the grid size W for a square-shaped grid may be 8 (e.g., an 8×8 grid of pixel values for a total of 64 pixel values). The gain/offset compensation module 212 may determine the minimum pixel value and the maximum pixel value of each grid. In an example, the minimum value may be the lowest pixel value in a particular grid (e.g., as low as zero) and the maximum value may be a highest pixel value in the particular grid (e.g., up to a maximum value of the uncompressed bits). The maximum value of the uncompressed bits may be $2^M-1$, where M is the source bit-depth. In an example of 20 bits for the source bit-depth, the maximum value may be $2^{20}-1=1,048,575$.

The offset parameter may be the minimum value of the pixel values in each grid. For example, if the minimum value is greater than the maximum pixel value of the compressed bit-depth (e.g., $2^I-1$), then the offset may be equal to the maximum value of the compressed bit-depth. If the minimum value is not greater than the maximum pixel value of the compressed bit-depth, then the offset may be the minimum value of the pixel values in the grid. In an example, for the compressed bit-depth of 12-bits, the maximum pixel value of the compressed bit-depth may be $2^{12}-1=4,095$.

The gain parameter may be calculated from the offset parameter. An intermediate value (e.g., a delta value) may be calculated. The delta value may be calculated by subtracting the offset parameter from the maximum pixel value of the particular grid. If the delta value is less than or equal to the maximum value of the compressed bit-depth, then the gain parameter may be set to 1.0 (e.g., unity). If the delta value is greater than the maximum value of the compressed bit-depth, then the gain value may be determined by an equation (e.g., EQ1):

$$\text{Gain}=(\text{Delta value})/(2^I-1) \qquad \text{(EQ1)}$$

For example, the delta value may be divided by the maximum value of the compressed bits. The gain value may be determined to a particular precision (e.g., number of decimal places). The greater the precision, the more storage capacity may be used for the compressed pixel data 142a-142n and/or the greater the system complexity. The greater the precision, the less the amount of visual quality loss due to compression.

The gain/offset compensation module 212 may calculate the compressed pixel values in response to the gain parameter and the offset parameter. The compressed pixel values may be calculated at the compressed bit-depth I. The compressed pixel values may be determined for each pixel value in the grid using the corresponding gain parameter and offset parameter determined specific to the grid. The compressed pixel values may be determined according to an equation (e.g., EQ2):

$$\text{pixel\_value}_{Depth\text{-}I}=(\text{pixel\_value}_{Depth\text{-}M}-\text{offset})/\text{gain} \qquad \text{(EQ2)}$$

The equation EQ2 may divide the subtraction of the offset from the pixel value at the source bit-depth from the source video frames 202a-202n by the gain value.

The gain/offset compensation module 212 may generate a signal (e.g., BVALUE). The signal BVALUE may comprise the compression parameters and/or the pixel values at the compressed bit-depth. For example, the compression parameters may comprise the grid size (H and W), the compressed bit-depth I, the source bit-depth M, and a table comprising the gain parameter and the offset parameter for each of the grids. The signal BVALUE may be presented to the compression formatting module 214.

The compression formatting module 214 may be configured to receive the signal BVALUE. The compression formatting module 214 may be configured to generate the compressed video frames 204a-204n. The compressed video frames 204a-204n may comprise an image header 220 and/or pixel values 222. The compressed video frames 204a-204n may comprise the pixel values at the compressed bit-depth I. In an example, each of the compressed video frames 204a-204n may have a similar implementation as the output image 124 described in association with FIG. 2. In one example, the compressed video frames 204a-204n may comprise 12-bit compressed HDR video frames. The compressed video frames 204a-204n may be presented to the output of the compression pipeline 130. The compressed video frames 204a-204n may be generated by the compression formatting module 214 in response to the signal BVALUE.

The compression formatting module 214 may be configured to save the compression information (e.g., the compression parameters from the signal BVALUE) in the image header 220. The image header 220 may comprise metadata that may be used by the processor 102 for interpreting the data in the compressed video frames 204a-204n. The image header 220 may store the grid-size H×W, the compressed bit-depth I, the source bit-depth M, the gain parameters and the offset parameters for each of the grids. For example, the image header 220 may comprise a table of the resultant values of the gain parameter, and the offset parameter corresponding to each of the grids. The pixel values 222 may comprise the compressed pixel values 142a-142n generated from the source pixel values 140a-140n in response to the compression operations 120 (e.g., generated in response to the equation EQ2). For example, the pixel values 222 may be the compressed image data. The compression formatting module 214 may save the compressed images 204a-204n at the compressed bit-depth I. In one example, the compressed images 204a-204n may be stored by the memory 108.

Figure 5:
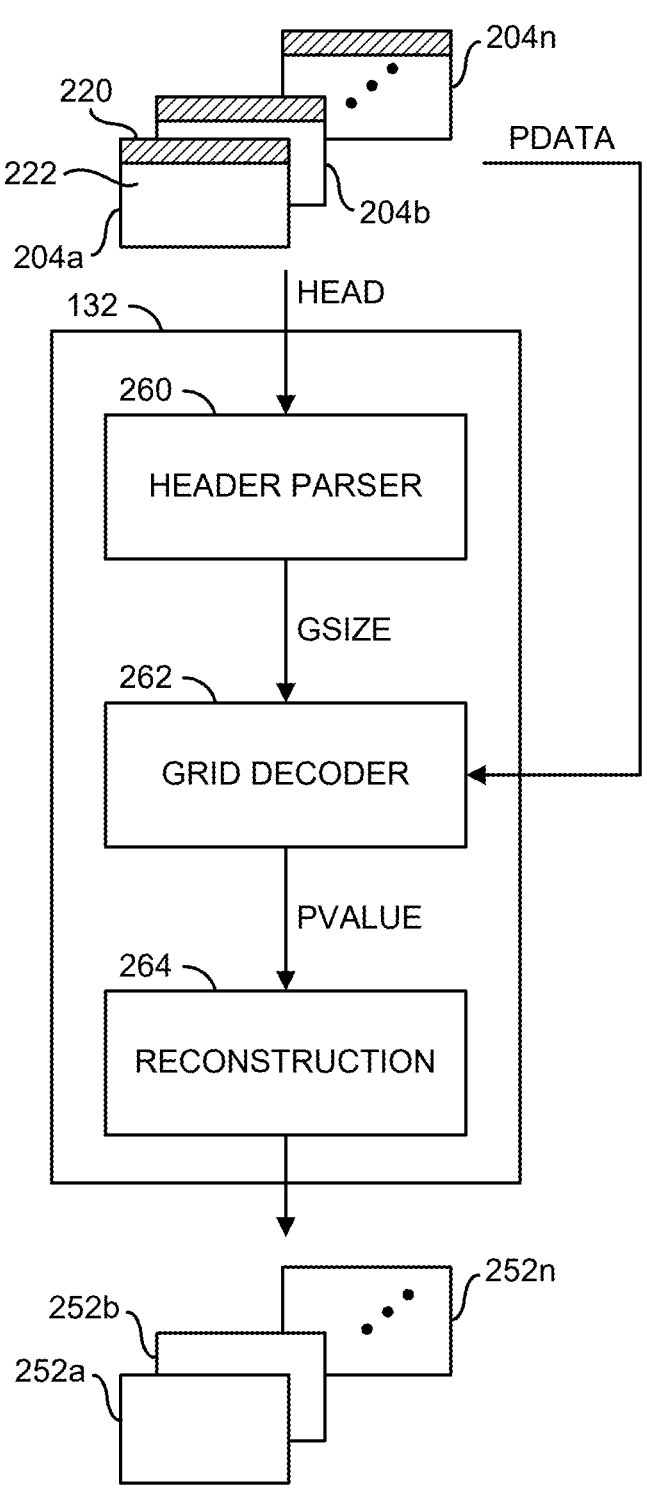
FIG. 5 is a block diagram illustrating components of a decompression pipeline of a processor.

Referring to FIG. 5, a block diagram illustrating components of a decompression pipeline of a processor is shown. A decompression block diagram 250 is shown. The decompression block diagram 250 may provide an illustrative example of a portion of the processor 102. The decompression block diagram 250 may comprise the decompression pipeline 132, the compressed video frames 204a-204n and/or video frames 252a-252n. The video frames 252a-252n may be decompressed video frames.

The decompression pipeline 132 may be configured to receive the compressed video frames 204a-204n. The decompression pipeline 132 may be configured to generate the decompressed (or reconstructed) video frames 252a-252n in response to the compressed video frames 204a-204n. The compressed video frames 204a-204n may comprise the compression parameters that may be used by the decompression pipeline 132 to reconstruct visual content similar to the source video frames 202a-202n. The decompressed video frames 252a-252n may have a similar implementation as the decompressed image 152 described in association with FIG. 3. The decompression pipeline 132 may be configured to generate image data similar to the source video frames 202a-202n in response to the compressed video frames 204a-204n. The compressed video frames may comprise the pixel values at the compressed bit-depth I and the decompressed images 152 may comprise the pixel values at the source bit-depth M. In an example, the decompressed video frames 252a-252n may comprise 20-bit HDR video frames reconstructed from the 12-bit HDR compressed video frames 204a-204n.

The decompression pipeline 132 may comprise a block (or circuit) 260, a block (or circuit) 262 and/or a block (or circuit) 264. The circuit 260 may implement a header parser module. The circuit 262 may implement a grid decoder module. The circuit 264 may implement a reconstruction module. The decompression pipeline 132 may comprise other components (not shown). The number, type and/or arrangement of the components of the decompression pipeline 132 may be varied according to the design criteria of a particular implementation.

The decompression pipeline 132 is shown receiving a signal (e.g., HEAD) and/or a signal (e.g., PDATA). The signal HEAD may comprise the image header 220 from each of the compressed video frames 204a-204n. The signal PDATA may comprise the image data 222 from each of the compressed video frames. The signal HEAD may be presented to the header parser module 260. The signal PDATA may be presented to the grid decoder module 262.

The header parser module 260 may be configured to parse the data in the image header 220 of the compressed video frames 204a-204n. The header parser module 260 may receive the signal HEAD comprising the image header 220 from the compressed video frames 204a-204n. The header parser module 260 may read the data in the image header 220 to determine the grid-size H×W (e.g., the height and width, which may be two different values). The image header parser module 260 may load the table of the bit-depth, the gain parameters and the offset parameters for each of the grids. The header parser module 260 may generate a signal (e.g., GSIZE). The signal GSIZE may be generated in response to the image header 220 for each of the compressed video frames 204a-204n. The signal GSIZE may comprise the grid-size and/or the bit-depths, offset parameters and grid parameters for each grid. The signal GSIZE may be presented to the grid decoder module 262.

The grid decoder module 262 may be configured to divide the image data of the compressed video frames 204a-204n into multiple grids based on the grid-size H×W. The grid decoder module 262 may receive the signal PDATA comprising the image data 222 from the compressed video frames 204a-204n (e.g., the pixel values at the compressed bit-depth I). The grid decoder module 262 may receive the grid-size W (and H, if the grid-size has a different width and height value) from the signal GSIZE. In an example, if the grid-size is 8×8, then the grid decoder module 262 may divide image data 222 of the video frames 204a-204n into 8×8 distinct regions (e.g., square regions with 64 pixel values). For example, the grids may correspond to the same location of the regions of pixels in both the source video frames 202a-202n and the compressed video frames 204a-204n. The grid decoder module 262 may associate the offset parameters and the grid parameters loaded from the image header 220 with the corresponding grid of pixel values. The grid decoder module 262 may generate a signal (e.g., PVALUE). The signal PVALUE may comprise the compressed pixel data for each grid and the associated compression parameters for the particular grid. The signal PVALUE may be presented to the reconstruction module 264. In some embodiments, the compression parameters and the pixel values may be provided sequentially by the grid decoder module 262 (e.g., one grid at a time in order). In some embodiments, the compression parameters and the pixel values may be provided in parallel by the grid decoder module 262 (e.g., all grids at once, or a group of grids in parallel followed by another group of grids in parallel). For example, the amount of data that may be communicated by the grid decoder module 262 at once may depend on the availability of the memory 108.

The reconstruction module 264 may be configured to reconstruct the reconstructed video frames 252*a*-252*n*. The reconstructed video frames 252*a*-252*n* may be generated by the reconstruction module 264 in response to the signal PVALUE. The reconstructed video frames 252*a*-252*n* may have the same bit-depth (e.g., the source bit-depth M) as the source video frames 202*a*-202*n* used by the compression pipeline 130 to generate the compressed video frames 204*a*-204*n*. In an example, for 20-bit HDR images, with a predefined bit-depth of 12-bits for the compressed bit-depth, the source video frames 202*a*-202*n* may have a bit-depth of 20-bits, the compressed video frames 204*a*-204*n* may have a bit-depth of 12-bits and the reconstructed video frames 252*a*-252*n* may have a bit-depth of 20-bits.

The reconstruction module 264 may use the compression parameters provided in the signal PVALUE (e.g., the bit-depth, the gain parameter and the offset parameter) to reconstruct a pixel value at the source bit-depth M for each pixel in each grid. The pixel values at the source bit-depth may be generated according to an equation (e.g., EQ3):

$$\text{pixel\_value}_{Depth-M}=(\text{Gain*pixel\_value}_{Depth-I})+\text{Offset} \qquad (EQ3)$$

The equation EQ3 may multiply the gain parameter by the pixel value at the compressed bit-depth I and then add the offset parameter. Each pixel value in a grid may be determined. Then the operations may be repeated for the pixel values in a next grid (e.g., using the particular gain parameter and offset parameter associated with the next grid) until all of the grids have been processed.

After calculating the pixel values at the source bit-depth M, the reconstruction module 264 may save one of the reconstructed video frames 252*a*-252*n*. The reconstructed video frames 252*a*-252*n* may have the source bit-depth of M. In an example, the reconstructed video frame 252*a*-252*n* may be saved to the memory 108. In another example, the reconstructed video frames 252*a*-252*n* may be communicated to a display device.

Figure 6:
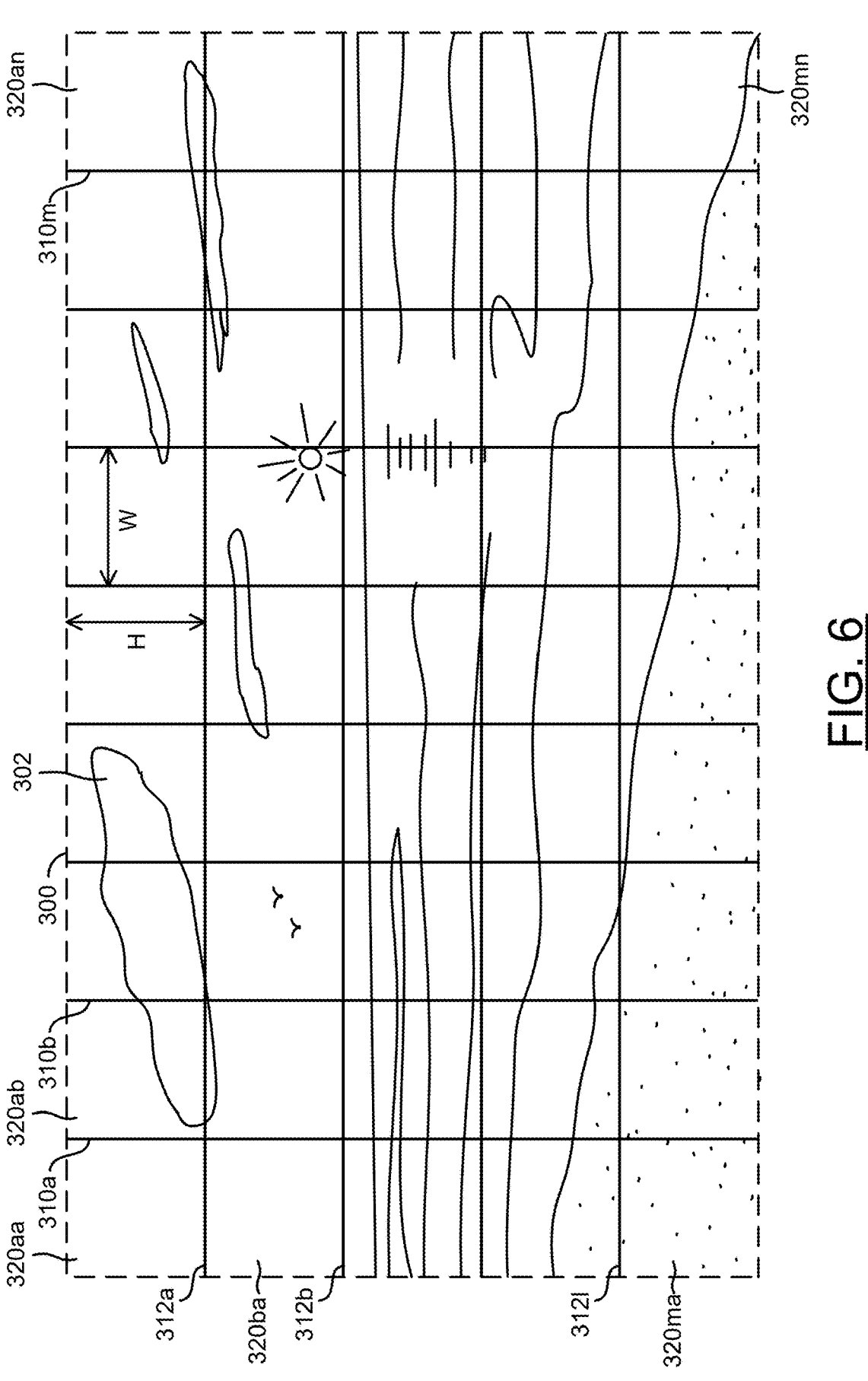
FIG. 6 is a diagram illustrating dividing an HDR image into grids.

Referring to FIG. 6, a diagram illustrating dividing an HDR image into grids is shown. An image 300 is shown. In one example, the image 300 may be an HDR image. In another example, the image 300 may be a SDR image. The image 300 may comprise image data 302. In the example shown, the image data 302 may capture a sunset on a beach. For example, the image data 302 may be a visual representation of the pixel data 140*a*-140*n* at the source bit-depth M in the input image 122. The type of image data 302 and/or the type of image 300 may be varied according to the design criteria of a particular implementation.

In some embodiments, the image 300 may be one of the source video frames 202*a*-202*n* shown in association with FIG. 4. For example, the image 300 may be received by the compression pipeline 130 to convert from the source bit-depth to the compressed bit-depth using the compression operations 120. In some embodiments, the image 300 may be one of the compressed video frames 204*a*-204*n* shown in association with FIG. 5. For example, the image 300 may be received by the decompression pipeline 132 to convert from the compressed bit-depth to the source bit-depth using the decompression operations 150. The processor 102 may divide the image 300 into grids whether performing the compression operations 120 and/or the decompression operations 150. For both the source video frames 202*a*-202*n* and the compressed video frames 204*a*-204*n*, the grids may comprise the same locations of the pixel values (e.g., the grids may be located in the same region of the image, but may have different pixel values at the different bit-depths).

The image 300 is shown with a number of vertical lines 310*a*-310*m* and a number of horizontal lines 312*a*-3121 overlaid on the image data 302. The vertical lines 310*a*-310*m* and the horizontal lines 312*a*-3121 may be shown as an illustrative example. Generally, the vertical lines 310*a*-310*m* and/or the horizontal lines 312*a*-3121 may not appear when the image 300 is displayed. In some embodiments, the vertical lines 310*a*-310*m* and/or the horizontal lines 312*a*-3121 may appear when the image 300 is displayed in a debug mode of operation.

Grids 320*aa*-320*mn* are shown on the image data. The grids 320*aa*-320*mn* may be regions of the image data 302 bounded by the vertical lines 310*a*-310*m* and/or the horizontal lines 312*a*-3121. Each of the grids 320*aa*-320*mn* may comprise pixel values of the image data 302. Each of the grids 320*aa*-320*mn* may represent one region of pixel values of the image 300. For example, both the source video frames 202*a*-202*n* and the compressed video frames 204*a*-204*n* may have the same locations for the regions represented by the grids 320*aa*-320*mn* (e.g., with different pixel values in the corresponding regions).

The grids 320*aa*-320*mn* may each have a height H and a width W. In the example shown, each of the grids 320*aa*-320*mn* may be a square shape. In one example, the height H may be equal to the width W. For a square-shaped grid, the width W may be the grid-size of each of the grids 320*aa*-320*mn*. In one example, the width W may be equal to 8 pixels and each of the grids 320*aa*-320*mn* may comprise an array of 8×8 pixels. In another example, the width W may be equal to 16 pixels and each of the grids 320*aa*-320*mn* may comprise an array of 16×16 pixels. In yet another example, the width W may be equal to 32 pixels and each of the grids 320*aa*-320*mn* may comprise an array of 32×32 pixels. In some embodiments, the height H and the width W may have different values. For example, each of the grids 320*aa*-320*mn* may be a rectangular shape. In one example, for a 1920×1080 image, the width W may be 10 pixels and the height H may be 8 pixels, and each of the grids may be 10×8 pixels (e.g., 135 rows and 192 columns of grids in the image). The size of each of the grids 320*aa*-320*mn* may be varied according to the design criteria of a particular implementation.

For the compression operations 120, the grid encoding module 210 may segment the image 300 into the grids 320*aa*-320*mn* with the width W and the height H before compression. In an example, the grid encoding module 210 may determine the grid-size H×W in response to the signal C-RATIO. In another example, the grid encoding module 210 may determine the grid-size H×W in response to an analysis of the statistical information of the image data 302. For the decompression operations 150, the grid decoder module 262 may segment the image 300 into the grids 320*aa*-320*mn* with the width W and the height H before decompression (e.g., the same grid size as used for the compression operations 120). In an example, the header parser module 260 may determine the grid-size in response to parsing the compression parameters in the image header 220 and present the grid-size to the grid decoder module 262 in the signal GSIZE. Since the width and height of the grids 320*aa*-320*mn* serve as the basis for compression and decompression, setting the dimensions of the grid may control the amount of loss. In an example, the greater the bit-depth of compression, the smaller the dimensions for the grid-size should be set.

Figure 7:
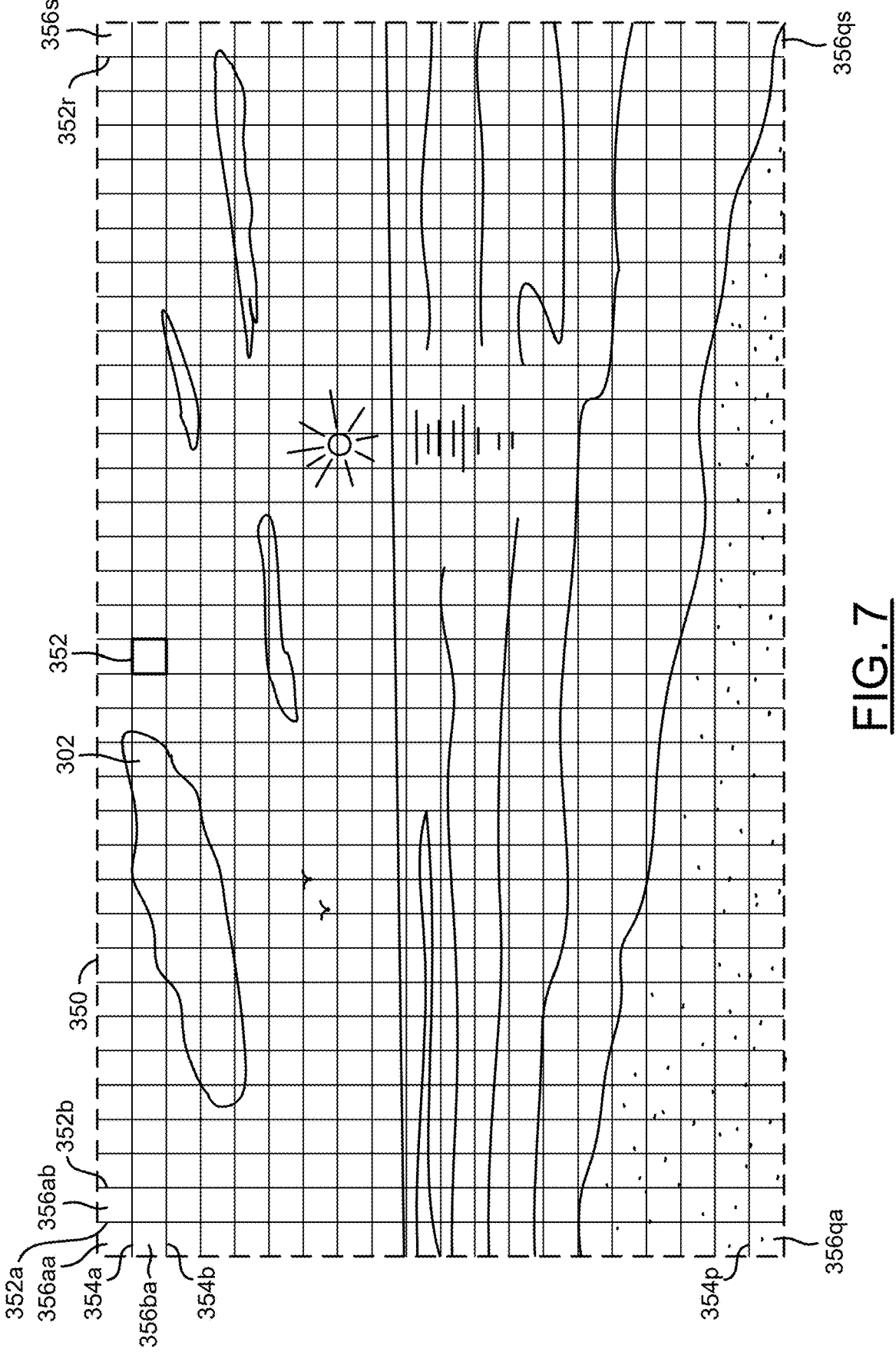
FIG. 7 is a diagram illustrating dividing an HDR image into grids with a small grid size.

Referring to FIG. 7, a diagram illustrating dividing an HDR image into grids with a small grid size is shown. An image 350 is shown. The image 350 may comprise the image data 302. The image 350 may be similar to the image 300 described in association with FIG. 6 but with different grid-size H×W. For example, the image data 302 of the image 350 may comprise the same sunset at a beach as the image data 302 of the image 300.

The image 350 is shown with a number of vertical lines 352a-352r and a number of horizontal lines 354a-354p overlaid on the image data 302. In the example shown, the image 350 may comprise more of the vertical lines 352a-352r and the horizontal lines 354a-354p than the number of vertical lines 310a-310m and the horizontal lines 312a-3121 shown in association with FIG. 6. The vertical lines 352a-352r and the horizontal lines 354a-354p may form grids 356aa-356qs. In the example shown, the image 350 may comprise more of the grids 356aa-356qs than the number of grids 320aa-320mn shown in association with FIG. 6. Each of the grids 356aa-356qs may comprise pixel data of a region of the image data 302.

A grid-size 352 is shown. The grid-size 352 may represent a number of pixel values in a particular region of the image 350. The grid-size 352 may be smaller than the grid-size W shown in association with FIG. 6. In one example, the grid-size H×W of the image 300 may be 16×16 and the grid-size 352 of the image 350 may be 4×4. The small grid-size 352 may comprise fewer pixel values than a larger grid size. With the small grid-size 352, there may be more compression parameters to store in the image header 220. For example, with the small grid-size 352 the compression parameters for each of the grids 356aa-356qs may apply to a fewer number of pixel values than for a larger grid-size. The small grid-size 352 may provide more granular details of the various regions of the image data 302 than using a larger grid-size.

The smaller width and height settings for the grid-size, the smaller the amount of loss. Generally, the greater the bit-depth of the compression, the smaller the size of the grid dimensions should be set. For example, with a smaller grid-size, more adaptive processing may be performed (e.g., more combinations of gain parameters and offset parameters may be stored in the image header 220 to adapt to the statistical information of each of the grids 356aa-356qs). Generally, the smaller the grid-size, the more computational overhead may be added. For example, more computations may be performed to individually determine the offset parameter and the gain parameter for each of the grids 356aa-356qs compared to the amount of computations for the number of the grids 320aa-320mn.

Figure 8:
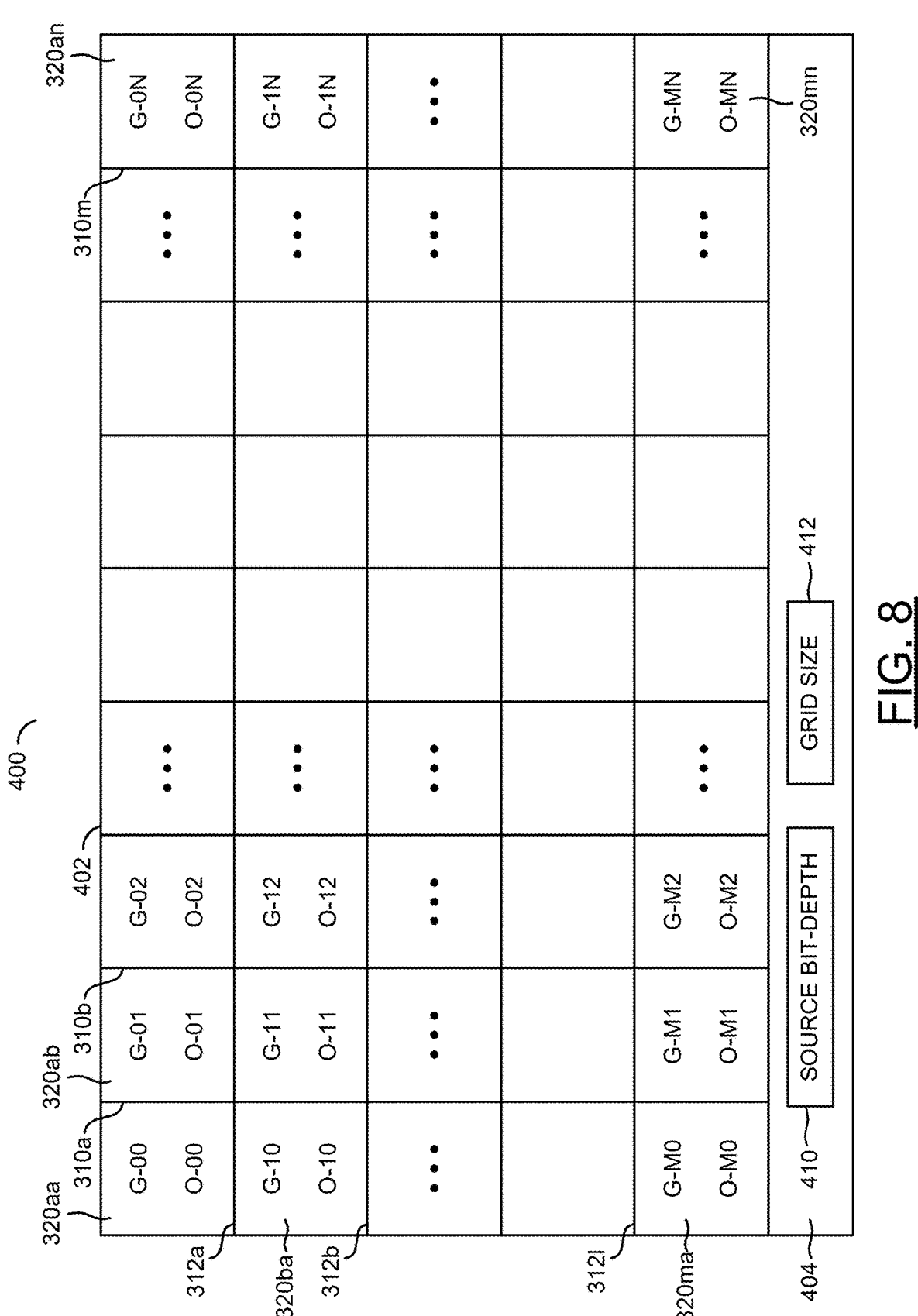
FIG. 8 is a diagram illustrating compression parameters corresponding to the grids of an image.

Referring to FIG. 8, a diagram illustrating compression parameters corresponding to the grids of an image is shown. Example image header data 400 is shown. The image header data 400 may comprise a table of values 402 and/or reconstruction parameters 404. The table of values 402 may provide an illustrative example of the table of compression parameters stored in the image header 220 of the compressed video frames 204a-204n. The reconstruction parameters 404 may comprise other compression parameters used to reconstruct the reconstructed video frames 252a-252b from the compressed video frames 204a-204n. In one example, the reconstruction parameters 404 may further comprise the compressed bit-depth I. For example, the combination of the table of values 402 and the reconstruction parameters 404 may provide each of the compression parameters used by the decompression pipeline 132. The example image header data 400 may be used to reconstruct images at the source bit-depth from the compressed video frames 204a-204n using the decompression operations 150.

The table of values 402 may comprise the vertical lines 310a-310m and the horizontal lines 312a-3121 arranged as the grids 320aa-320mn. The grids 320aa-320mn may be arranged as the grids 320aa-320mn of the image data 302 of the image 300 shown in association with FIG. 6. For example, the table of values 402 may correspond to the image 300 shown in association with FIG. 6. In the example shown, the table of values 402 stored in the image header 220 may be represented as the grids 320aa-320mn for illustrative purposes. For example, the table of values 402 may be an actual grid of values. The table of values 402 may be data arranged in a format stored in the image header 220 that may be parsed as values corresponding to the particular grids 320aa-320mn by the decompression pipeline 132 (e.g., by the header parser module 260). The grids 320aa-320mn may represent the same locations for the regions of pixel values in both the source images 202a-202n and the compressed images 204a-204n. For example, the grids 320aa-320mn may represent the grids used by the compression pipeline 130 and the decompression grids used by the decompression pipeline 132. While the grids 320aa-320mn may represent the same locations of the pixel data for both the source images 202a-202n and the compressed images 204a-204n, the pixel data in the same grid locations may be different (e.g., the pixel values in the grid 320aa for the source image 202a may have pixel values at the source bit-depth M and the pixel values in the decompression grid 320aa for the compressed image 204a may have pixel values at the compressed bit-depth I). For example, the pixel values in the corresponding grids 320aa-320mn in the source images 202a-202n and the compressed images 204a-204n may represent the same image data 302, but at different bit depths.

The table of values 402 may comprise gain parameters G-00-G-MN and offset parameters O-00-O-MN. Each of the gain parameters G-00-G-MN and the offset parameters O-00-O-MN may correspond with a respective one of the grids 320aa-320mn. In the example shown, the gain parameter G-00 and the offset parameter O-00 may be associated with the grid 320aa, the gain parameter G-01 and the offset parameter O-01 may be associated with the grid 320ab, the gain parameter G-0N and the offset parameter O-0N may be associated with the grid 320an, the gain parameter G-10 and the offset parameter O-10 may be associated with the grid 320ba, the gain parameter G-MO and the offset parameter O-MO may be associated with the grid 320ma, the gain parameter G-MN and the offset parameter O-MN may be associated with the grid 320mn, etc.

Each of the grids 320aa-320mn may have corresponding pixel values in the image data 222. Each of the pixel values may comprise the pixel values corresponding to each pixel in one of the grids 320aa-320mn. For example, if the grid-size is 8×8, then the pixel values 222 may comprise a distinct group of 64 pixel values corresponding to the grid 320aa, a distinct group of 64 pixel values corresponding to the grid 320ab, a distinct group of 64 pixel values corresponding to the grid 320an, a distinct group of 64 pixel values corresponding to grid 320ba, a distinct group of 64 pixel values corresponding to the grid 320ma, a distinct group of 64 pixel values corresponding to the grid 320mn, etc.

Each of the gain parameters G-00-G-MN and each of the offset parameters O-00-O-MN may correspond to a respective one of the distinct groups of pixel values of the grids 320aa-320mn. For the compression operations 120, the pixel values in the grids 320aa-320mn of the source video frames 202a-202n may be used to derive the respective gain parameters G-00-G-MN and the respective offset parameters O-00-O-MN. For the decompression operations 150, the respective gain parameters G-00-G-MN and the respective offset parameters O-00-O-MN may be applied to the respective pixel values of the corresponding grids 320aa-320mn in the compressed video frames 204a-204n to generate the pixel values at the source bit-depth for the reconstructed video frames 252a-252n.

The amount of data stored for each of the grids 320aa-320mn may determine the accuracy of the decompression. The gain parameters G-00-G-MN may be stored at a predetermined precision. The precision may be the number of decimal values stored for the gain parameters G-00-G-MN (e.g., stored as a floating point value). Generally, the greater the precision of the gain parameters G-00-G-MN, the smaller the loss. For example, if the precision of the gain parameters G-00-G-MN is set to six decimal places, the loss may be smaller than when the precision of the gain parameters G-00-G-MN is set to three decimal places. The particular number of decimal places stored for the precision of the gain parameters G-00-G-MN may be varied according to the design criteria of a particular implementation.

The gain parameters G-00-G-MN may comprise data corresponding to an amplification of an image signal. The gain parameters G-00-G-MN may be analogous to ISO settings in digital cameras. For example, increasing the gain may brighten the image by amplifying the signal from the image sensor. Generally, the gain parameters G-00-G-MN may correspond to an overall image brightness and/or contrast. The gain parameters G-00-G-MN may be applied globally (e.g., overall gain) and/or separately for each color channel (e.g., RGB gain). Higher gain settings may amplify both signal and/or noise.

The offset parameters O-00-O-MN may correspond to a black level. The offset parameters O-00-O-MN may be a fixed value added to an intensity of each pixel. The offset parameters O-00-O-MN may shift a histogram (e.g., tone value curve) to the right, which may prevent signal loss in dark areas. The offset parameters O-00-O-MN may compensate for a darkness of the image sensor of the capture device 104 and/or ensure minimum pixel values above zero. For the image processing performed by the processor 102, the gain and/or offset corrections may be applied together to optimize the images before further processing and/or compression.

Each of the offset parameters O-00-O-MN may be determined based on the minimum and maximum pixel values from the distinct groups of pixels in the corresponding grids 320aa-320mn as described in association with FIG. 4. For example, the offset parameter O-00 may be based on the minimum pixel value of the distinct group of pixel values of the grid 320aa, the offset parameter O-01 may be based on the minimum pixel value of the distinct group of pixel values of the grid 320ab, the offset parameter O-MN may be based on the minimum pixel value of the distinct group of pixel values of the grid 320mn, etc.

Each of the gain parameters G-00-G-MN may be determined based on the corresponding offset parameters O-00-O-MN and the maximum pixel value in the distinct group of pixel values of the corresponding grids 320aa-320mn as described in association with FIG. 4. For example, the gain parameter G-00 may be determined using the equation EQ1 based offset parameter O-00 and the maximum pixel value of the distinct group of pixel values in the grid 320aa, the gain parameter G-01 may be determined using the equation EQ1 based offset parameter O-01 and the maximum pixel value of the distinct group of pixels in the grid 320ab, the gain parameter G-MN may be determined using the equation EQ1 based offset parameter O-MN and the maximum pixel value of the distinct group of pixel values in the grid 320mn, etc.

Each of the pixel values 222 at the compressed bit-depth may be determined based on the corresponding offset parameters O-00-O-MN and the corresponding gain parameters G-00-G-MN of the corresponding grids 320aa-320mn as described in association with FIG. 4. For example, the compressed pixel values stored in the image data 222 for the grid 320aa at the compressed bit-depth I may be determined using the equation EQ2 based on the source pixel values in the grid 320aa at the source bit-depth M, the offset parameter O-00 and the gain parameter G-00, the compressed pixel values for the grid 320ab stored in the image data 222 at the compressed bit-depth I may be determined using the equation EQ2 based on the source pixel values in the gird 320ab at the source bit-depth M, the offset parameter O-01 and the gain parameter G-01, the compressed pixel values for the grid 320mn stored in the image data 222 at the compressed bit-depth I may be determined using the equation EQ2 based on the source pixel values in the grid 320mn at the source bit-depth M, the offset parameter O-MN and the gain parameter G-MN, etc.

Each of the pixel values at the source bit-depth may be determined based on the corresponding offset parameters O-00-O-MN and the corresponding gain parameters G-00-G-MN of the corresponding grids 320aa-320mn as described in association with FIG. 5. For example, the reconstructed pixel values for the grid 320aa at the source bit-depth M may be determined using the equation EQ3 based on the compressed pixel values in the grid 320aa of the image data 222 at the compressed bit-depth I, the offset parameter O-00 and the gain parameter G-00, the reconstructed pixel values for the grid 320ab at the source bit-depth M may be determined using the equation EQ3 based on the compressed pixel values in the grid 320ab of the image data 222 at the compressed bit-depth I, the offset parameter O-01 and the gain parameter G-01, the reconstructed pixel values for the grid 320mn at the source bit-depth M may be determined using the equation EQ3 based on the compressed pixel values for the grid 320mn of the image data 222 at the compressed bit-depth I, the offset parameter O-MN and the gain parameter G-MN, etc.

The reconstruction parameters 404 may comprise a block 410 and/or a block 412. The block 410 may comprise data corresponding to a source bit-depth. The block 412 may comprise data corresponding to a grid size. The source bit-depth 410 may comprise the compression parameter for the source bit-depth M. The grid size 412 may comprise data corresponding to the compression parameter for the grid-size W. In some embodiments, the grid size 412 may store the grid-size W (e.g., one value) when the grid-size has a square shape. In some embodiments, the grid size 412 may store the grid-size W and H (e.g., two different values) when the grid-size has a rectangular shape.

The compressed images 204a-204n may have only one set of grid width and height settings (e.g., stored in the grid size 412). Different bit-depth compressions may have different grid width and height settings. For the same bit-depth compression, if a higher quality is desired and/or beneficial, the grid width W and grid height H settings may be smaller, and the gain accuracy may be higher.

Generally, the image header 220 may comprise the compression parameters. For example, the image header 220 may only contain the source bit-depth 410, the grid size 412, offset parameters O-00-O-MN for each grid, and the gain parameters G-00-G-MN for each grid and the image data 222 of the compressed image files 204a-204n may have pixel values at the compressed bit-depth. In some embodiments, the image header 220 may further comprise the compressed bit-depth I.

Figure 9:
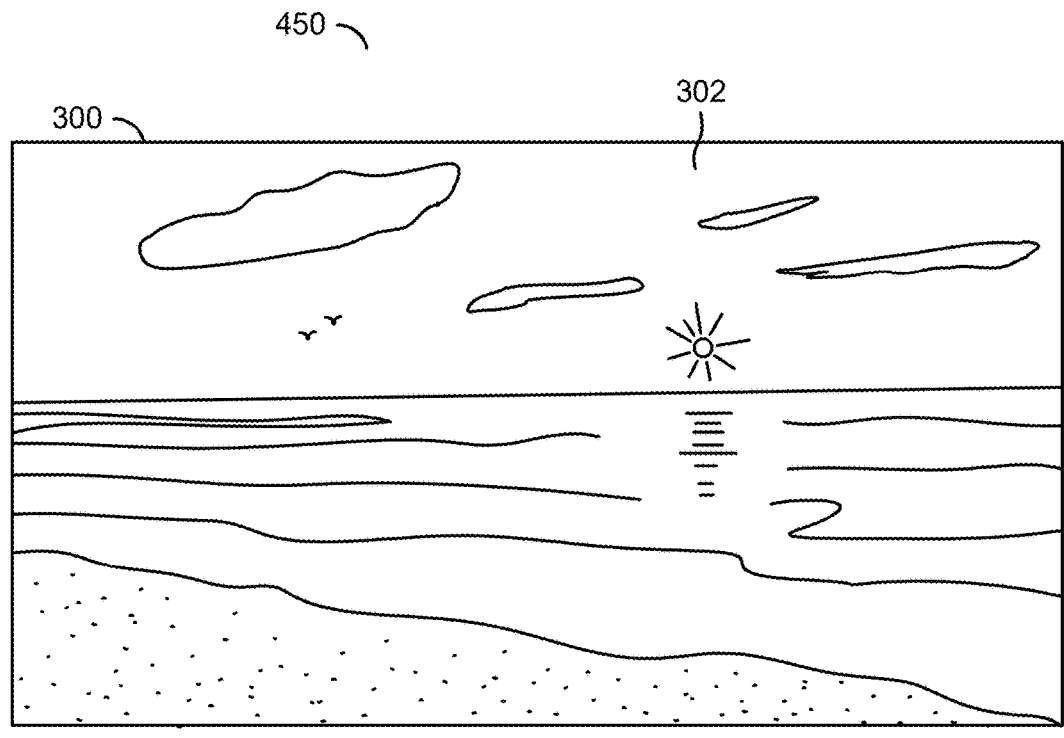
FIG. 9 is a diagram illustrating a pixel value histogram for a raw HDR image.
Figure 9:
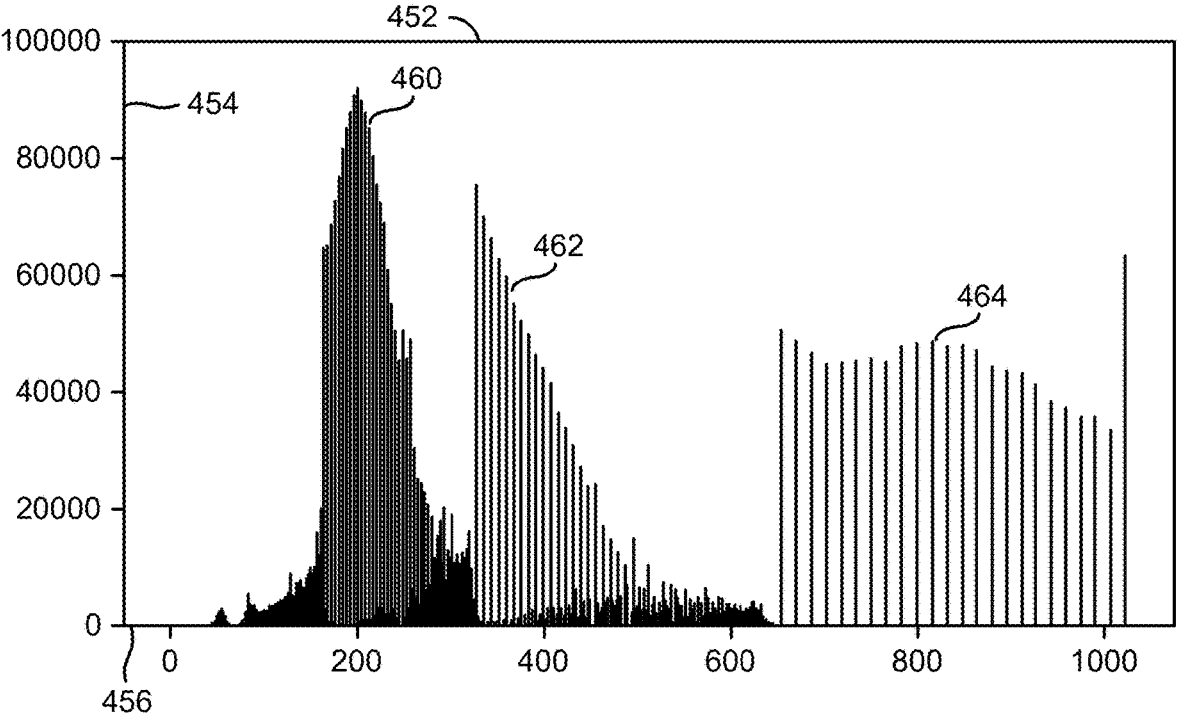

Referring to FIG. 9, a diagram illustrating a pixel value histogram for a raw HDR image is shown. A source image and histogram 450 is shown. The source image and histogram 450 may comprise the image 300 and a source histogram 452. The source image and histogram 450 may provide an illustrative example of the uncompressed, raw data operated on the by the processor 102. For example, the compressed video frames 204a may decompress into the reconstructed video frames 252a that may have similar visual content as the source image 300 and the source histogram 452.

The image 300 may comprise the image data 302. The image 300 may be the HDR image shown in association with FIG. 6 and/or FIG. 7 without the grids overlaid. For example, the image 300 may be displayed to an output device and/or stored in the memory 108 if no compression is performed. In the example shown, the image 300 may be a 20-bit image that may be compressed into a 12-bit image and then decompressed back into a 20-bit image.

The source histogram 452 may comprise an axis 454 and an axis 456. The axis 454 may comprise a Y-axis of the source histogram 452. The axis 456 may comprise an X-axis of the source histogram 452. The Y-axis 454 may comprise a frequency count for the pixel values in the image data 302. In the example shown, the Y-axis 454 may have a range of frequency counts from 0 to 100,000. The X-axis 456 may comprise bins and/or values for the pixel values (e.g., pixel intensities) of the image data 302. In the example shown, the range of the bins of the pixel values may be from 0 to 1024. Generally, for a 20-bit image, there may be pixel values from 0 to 1048575. However, for simplicity, the pixel values plotted may be from 0 to 1024 to provide a clear observation of data retention and/or loss.

The source histogram 452 may comprise pixel value clusters 460-464. The pixel value cluster 460 may comprise a high density of pixel values near the 0-300 range. The pixel value cluster 462 may comprise a medium density of pixel values near the 300-650 range. The pixel value cluster 464 may comprise a low density of pixel values near the 650-1024 range. Ideally, after the image 300 is compressed and decompressed, the histogram of the reconstructed image may have a similar distribution of the pixel value clusters 460-464 as shown in the source histogram 452.

Figure 10:
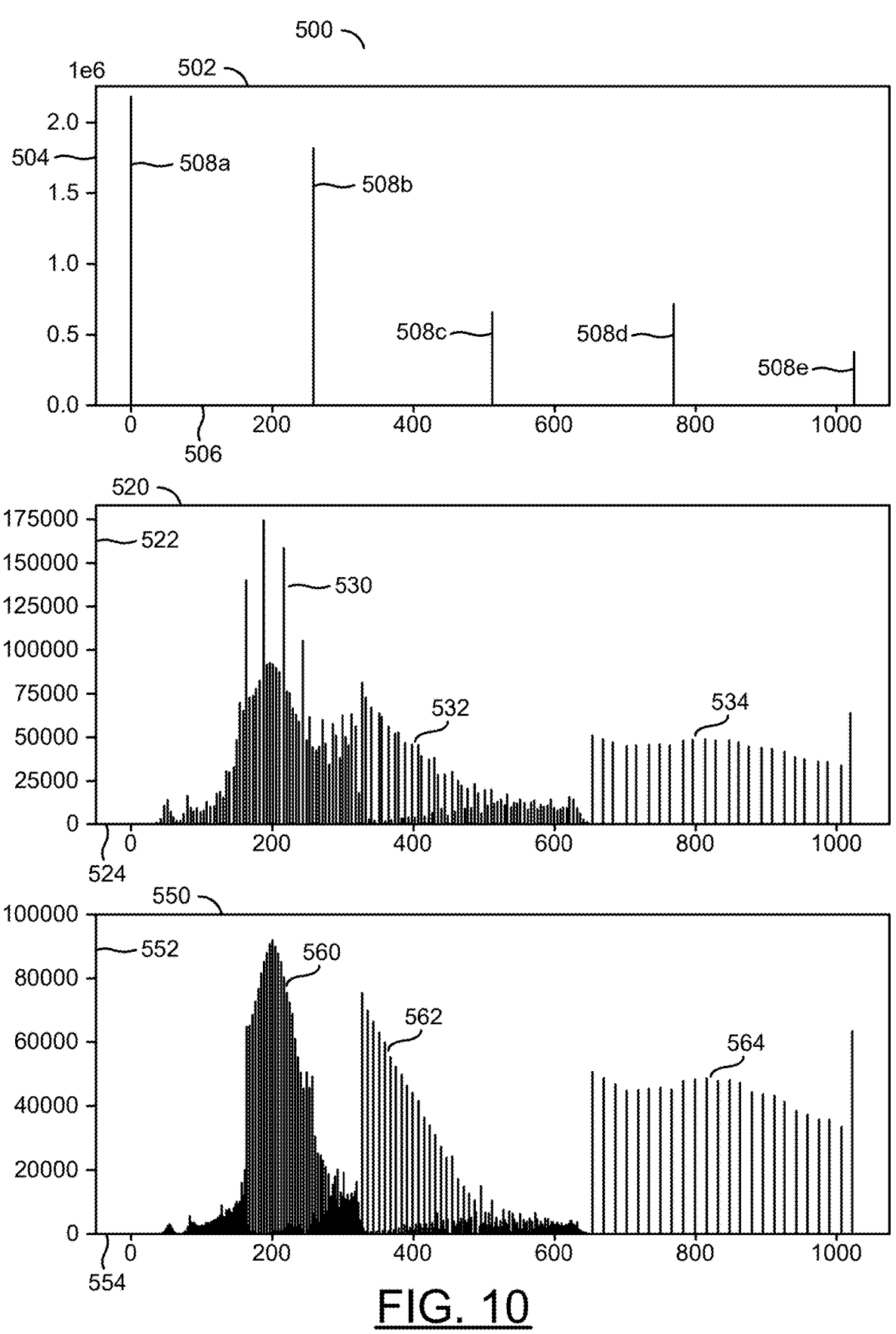
FIG. 10 is a diagram illustrating a pixel value histogram for various image compression techniques implemented by the processor.

Referring to FIG. 10, a diagram illustrating a pixel value histogram for various image compression techniques implemented by the processor is shown. Histograms 500 are shown. The histograms 500 may represent various compression and decompression techniques applied to the image 300. The histograms 500 may represent the distribution of pixel values after the image 300 has been compressed and decompressed. Better compression/decompression techniques may result in a histogram similar to the source histogram 452 shown in association with FIG. 9.

The processor 102 may be configured to implement various compression/decompression techniques. In one example, the memory 108 may store computer executable instructions for the compression/decompression techniques. The processor 102 may read the instructions from the memory 108 to perform the compression/decompression techniques. The processor 102 may be configured to perform the grid-based compression operations 120 and the grid-based decompression operations 150. In one example, the processor 102 may perform a linear compression and decompression. In another example, the processor 102 may perform a global gamma compression and decompression. The particular types of compression/decompression techniques implemented by the processor 102 may be varied according to the design criteria of a particular implementation.

A linear histogram 502 is shown. The linear histogram 502 may represent a histogram of a reconstructed image (e.g., with a bit-depth having the 20-bits of the source bit-depth of the image 300) generated using a linear compression and linear decompression. For example, the linear compression may be used to compress the image 300 to the 12-bits of the compressed bit-depth and the linear decompression may be used to reconstruct an image back to the 20-bits of the source bit-depth.

The linear histogram 502 may comprise an axis 504 and an axis 506. The axis 504 may comprise a Y-axis of the linear histogram 502. The axis 506 may comprise an X-axis of the linear histogram 502. The Y-axis 504 may comprise a frequency count for the pixel values in the reconstructed image. In the example shown, the Y-axis 504 may have a range of frequency counts from 0 to 200,000. The X-axis 506 may comprise bins and/or values for the pixel values (e.g., pixel intensities) of the reconstructed image. In the example shown, the range of the bins of the pixel values may be from 0 to 1024. Generally, for a 20-bit image, there may be pixel values from 0 to 1048575. However, for simplicity, the pixel values plotted may be from 0 to 1024 to provide a clear observation of data retention and/or loss.

The linear histogram 502 may comprise pixel value spikes 508a-508e. The pixel value spike 508a may be near the 0 value. The pixel value spike 508b may be near the 250 value. The pixel value spike 508c may be near the 500 value. The pixel value 508d may be near the 750 value. The pixel value 508e may be near the 1024 value. The pixel value spikes 508a-508e may be distributed differently from the pixel value clusters 460-464. Based on the linear histogram 502, the linear compression/decompression technique may not result in a reconstructed image similar to the image 300.

A global gamma histogram 520 is shown. The global gamma histogram 520 may represent a histogram of a reconstructed image (e.g., with a bit-depth having the 20-bits of the source bit-depth of the image 300) generated using a global gamma compression and global gamma decompression. For example, the global gamma compression may be used to compress the image 300 to the 12-bits of the compressed bit-depth and the global gamma decompression may be used to reconstruct an image back to the 20-bits of the source bit-depth. In the example shown, the global gamma histogram 520 may be generated using a gamma value of 3.6.

The global gamma histogram 520 may comprise an axis 522 and an axis 524. The axis 522 may comprise a Y-axis of the global gamma histogram 520. The axis 524 may comprise an X-axis of the global gamma histogram 520. The Y-axis 522 may comprise a frequency count for the pixel values in the reconstructed image. In the example shown, the Y-axis 522 may have a range of frequency counts from 0 to 200,000. The X-axis 524 may comprise bins and/or values for the pixel values (e.g., pixel intensities) of the reconstructed image. In the example shown, the range of the bins of the pixel values may be from 0 to 1024. Generally, for a 20-bit image, there may be pixel values from 0 to 1048575. However, for simplicity, the pixel values plotted may be from 0 to 1024 to provide a clear observation of data retention and/or loss.

The global gamma histogram 520 may comprise pixel value clusters 530-534. The pixel value cluster 530 may comprise a high density of pixel values near the 0-300 range. However, the pixel value cluster 530 may be less dense than the pixel value cluster 460. The pixel value cluster 532 may comprise a medium density of pixel values near the 300-650 range. However, the pixel value cluster 532 may be less dense than the pixel value cluster 462. The pixel value cluster 534 may comprise a low density of pixel values near the 650-1024 range. However, the pixel value cluster 534 may be less dense than the pixel value cluster 464. Based on the global gamma histogram 520, the global gamma compression/decompression technique may not result in a reconstructed image similar to the image 300. The global gamma compression/decompression may result in a more accurate reconstruction than the linear compression/decompression.

A grid-based histogram 550 is shown. The grid-based histogram 550 may represent a histogram of a reconstructed image (e.g., with a bit-depth having the 20-bits of the source bit-depth of the image 300) generated using the grid-based compression operations 120 and the grid-based decompression operations 150. For example, the grid-based compression operations 120 may be used to compress the image 300 to the 12-bits of the compressed bit-depth and the grid-based decompression operations 150 may be used to reconstruct an image back to the 20-bits of the source bit-depth. In the example shown, the grid-based histogram 550 may be generated using a grid-size of 16 pixels.

The grid-based histogram 550 may comprise an axis 552 and an axis 554. The axis 552 may comprise a Y-axis of the grid-based histogram 550. The axis 554 may comprise an X-axis of the grid-based histogram 550. The Y-axis 552 may comprise a frequency count for the pixel values in the reconstructed image. In the example shown, the Y-axis 552 may have a range of frequency counts from 0 to 100,000. The X-axis 554 may comprise bins and/or values for the pixel values (e.g., pixel intensities) of the reconstructed image. In the example shown, the range of the bins of the pixel values may be from 0 to 1024. Generally, for a 20-bit image, there may be pixel values from 0 to 1048575. However, for simplicity, the pixel values plotted may be from 0 to 1024 to provide a clear observation of data retention and/or loss.

The grid-based histogram 550 may comprise pixel value clusters 560-564. The pixel value cluster 560 may comprise a high density of pixel values near the 0-300 range. The pixel value cluster 560 may be similar to the pixel value cluster 460. The pixel value cluster 562 may comprise a medium density of pixel values near the 300-650 range. The pixel value cluster 562 may be similar to the pixel value cluster 462. The pixel value cluster 564 may comprise a low density of pixel values near the 650-1024 range. The pixel value cluster 534 may be similar to the pixel value cluster 464. Based on the grid-based histogram 550, the grid-based compression operations 120 and the grid-based decompression operations 150 may result in a reconstructed image similar to the image 300. The grid-based compression operations 120 and the grid-based decompression operations 150 may result in a more accurate reconstruction than the linear compression/decompression and/or the global gamma compression/decompression.

Figure 11:
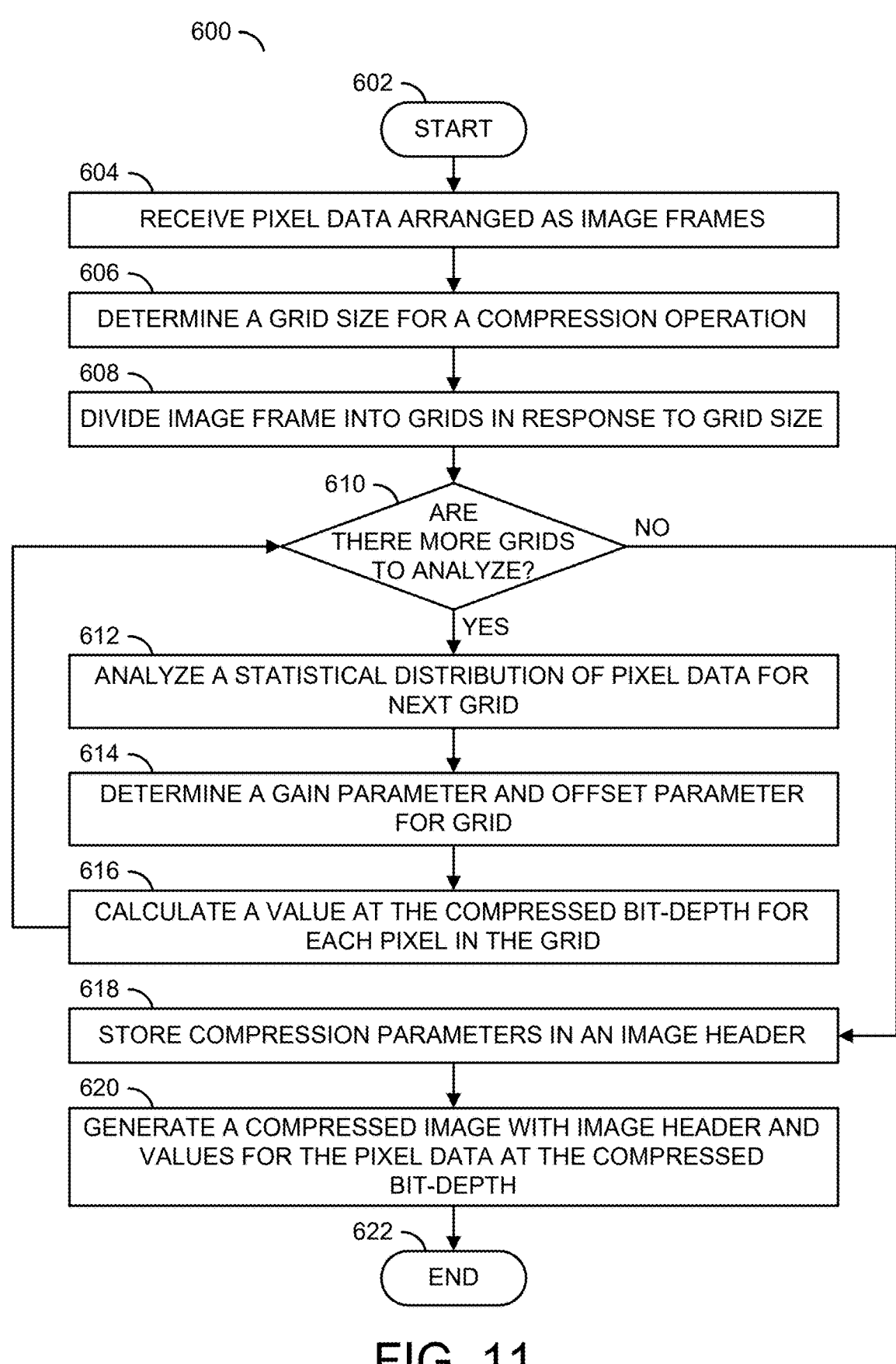
FIG. 11 is a flow diagram illustrating a method for providing a grid-based quantization-aware compression for high dynamic range images.

Referring to FIG. 11, a method (or process) 600 is shown. The method 600 may provide a grid-based quantization-aware compression for high dynamic range images. The method 600 generally comprises a step (or state) 602, a step (or state) 604, a step (or state) 606, a step (or state) 608, a decision step (or state) 610, a step (or state) 612, a step (or state) 614, a step (or state) 616, a step (or state) 618, a step (or state) 620, and a step (or state) 622.

The step 602 may start the method 600. In the step 604, the processor 102 may receive pixel data arranged as video frames. For example, the image sensor of the capture device 104 may generate the source video frames 202a-202n. Next, in the step 606, the processor 102 may determine a grid size for the compression operation 120. For example, the grid encoding module 210 of the compression pipeline 130 may determine the grid size W (or W and H) based on a target amount of image compression. In the step 608, the processor 102 may divide the image frame into grids in response to the grid size. For example, the grid encoding module 210 of the compression pipeline 130 may divide the source video frames 202a-202n into the grids 320aa-320mn. Next, the method 600 may move to the decision step 610.

In the decision step 610, the processor 102 may determine whether there are more grids to analyze. For example, the gain/offset compensation module 212 of the compression pipeline 130 may analyze each of the grids 320aa-320mn. If there are more grids to analyze, then the method 600 may move to the step 612. In the step 612, the processor 102 may analyze the statistical distribution of the pixel data for the next one of the grids 320aa-320mn. For example, the gain/offset compensation module 212 of the compression pipeline 130 may perform a statistical analysis of each of the pixel values for a current one of the grids 320aa-320mn. Next, in the step 614, the processor 102 may determine the gain parameter and the offset parameter for the grid. For example, the gain/offset compensation module 212 of the compression pipeline 130 may determine one of the gain parameters G-00-G-MN and one of the offset parameters O-00-O-MN for one of the grids 320aa-320mn using the equation EQ1. In the step 616, the processor 102 may calculate a value at the compressed bit-depth I for each pixel value in one of the grids 320aa-320mn. For example, the gain/offset compensation module 212 of the compression pipeline 130 may calculate the pixel value using the equation EQ2 based on the gain parameter and the offset parameter. Next, the method 600 may return to the decision step 610.

In the decision step 610, if there are no more of the grids 320aa-320mn to analyze, then the method 600 may move to the step 618. In the example shown, the steps 610-616 may calculate the gain and offset parameters and the compressed pixel values for each of the grids 320aa-320mn sequentially. In some embodiments, the gain and offset parameters and the compressed pixel values for each of the grids 320aa-320mn may be performed in parallel and/or substantially in parallel. In the step 618, the processor 102 may store the compression parameters in the image header 220. For example, the compression formatting module 214 may generate the image header 220 for the compressed images 204a-204n comprising the grid size, the source bit-depth, and a table of the grid and offset parameters corresponding to each of the grids 320aa-320mn. Next, in the step 620, the processor 102 may generate a compressed image with the image header 220 and the values for the pixel data at the compressed bit-depth I. For example, the compression formatting module 214 of the compression pipeline 130 may generate the compressed video frames 204a-204n comprising the image header 220 and the image data 222 having the compressed bit-depth I. For example, the compression operation 120 may generate the compressed image frames 204a-204n by converting the pixel data of the source image frames 202a-202n from the source bit-depth M to the compressed bit-depth I. The compressed bit-depth I may be less than the source bit-depth M. Next, the method 600 may move to the step 622. The step 622 may end the method 600.

Figure 12:
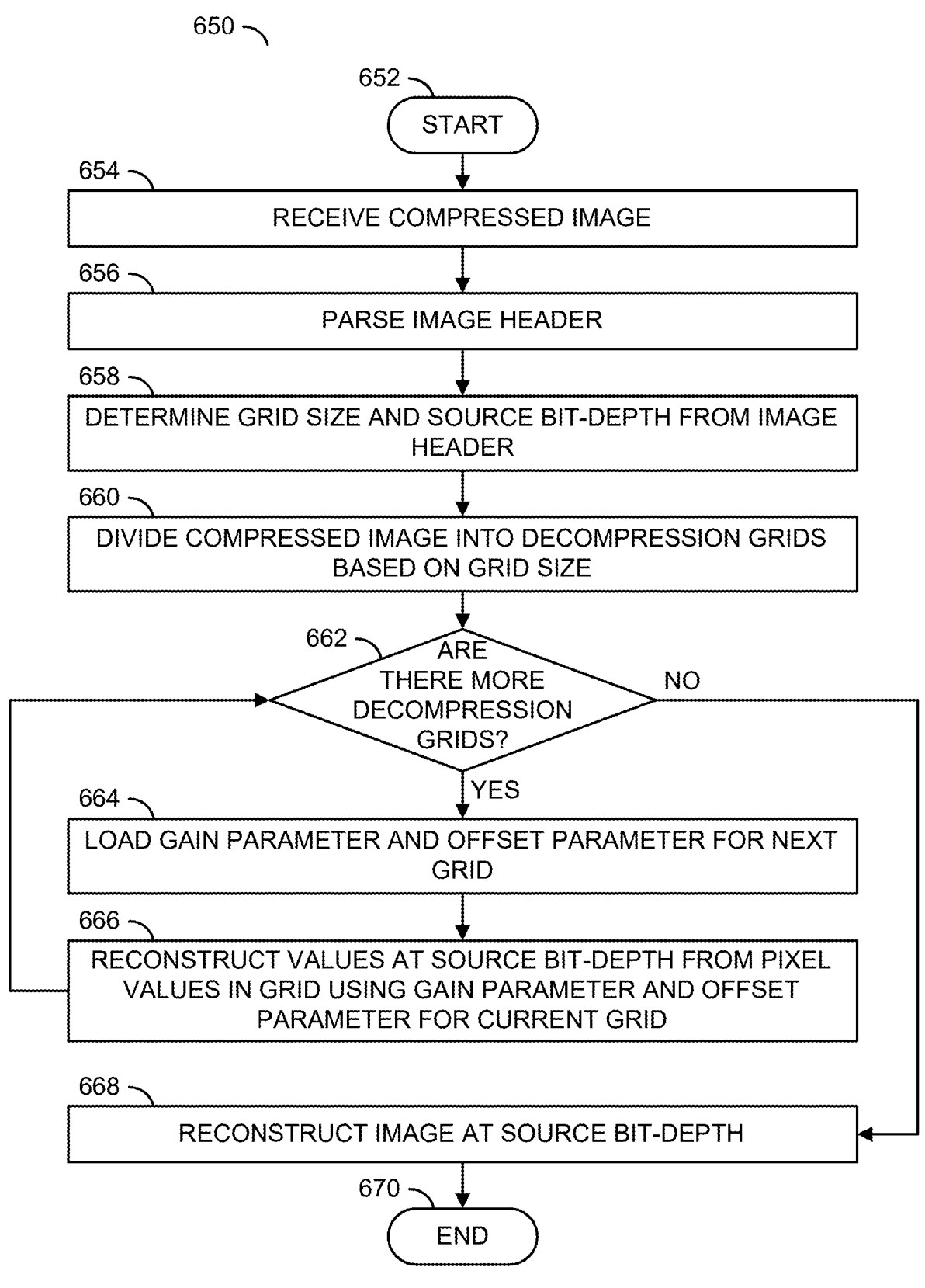
FIG. 12 is a flow diagram illustrating a method for providing a grid-based quantization-aware decompression for high dynamic range images.

Referring to FIG. 12, a method (or process) 650 is shown. The method 650 may provide a grid-based quantization-aware decompression for high dynamic range images. The method 650 generally comprises a step (or state) 652, a step (or state) 654, a step (or state) 656, a step (or state) 658, a step (or state) 660, a decision step (or state) 662, a step (or state) 664, a step (or state) 666, a step (or state) 668, and a step (or state) 670.

The step 652 may start the method 650. In the step 654, the decompression pipeline 132 may receive the compressed images 204a-204n. Next, in the step 656, the header parser module 260 may parse the image header 220. For example, the header parser module 260 may receive the signal HEAD comprising the image header 220. In the step 658, the header parser module 260 may determine the grid size and the source bit-depth from the image header 220. For example, the header parser module 260 may read the source bit-depth value 410 and the grid size value 412. Next, in the step 660, the grid decoder module 262 may divide one of the compressed image frames 204a-204n into the decompression grids 320aa-320mn in response to the grid size. For example, the grid decoder module 262 may receive the image data 222 in the signal PDATA and divide the image data 222 based on the grid size. Next, the method 650 may move to the decision step 662.

In the decision step 662, the decompression pipeline 132 may determine whether there are more of the decompression grids 320aa-320mn. For example, the grid decoder module 262 of the decompression pipeline 132 may analyze each of the decompression grids 320aa-320mn. If there are more decompression grids to analyze, then the method 650 may move to the step 664. In the step 664, the grid decoder module 262 may load one of the gain parameters G-00-G-MN and one of the offset parameters O-00-O-MN for a next one of the decompression grids 320aa-320mn. For example, the gain parameters G-00-G-MN and the offset parameters O-00-O-MN may be stored in the table of values 402 of the image header 220. Next, in the step 666, the reconstruction module 264 may reconstruct the pixel values at the source bit-depth M from the pixel values in the corresponding one of the decompression grids 320aa-320mn using the gain parameters and the offset parameters for the current decompression grid and the pixel valuers for the current decompression grid (e.g., provided by the signal PVALUE). For example, the decompression pipeline 132 may calculate the equation EQ3 to generate the pixel value at the source bit-depth M from the pixel value at the compressed bit-depth I and one of the gain parameters and offset parameters. Next, the method 650 may return to the decision step 662.

In the decision step 662, if there are no more of the decompression grids 320aa-320mn to analyze, then the method 600 may move to the step 668. In the example shown, the steps 662-666 may calculate determine the gain and offset parameters and calculate the reconstructed pixel value sequentially. In some embodiments, the gain and offset parameters and the reconstructed pixel values for each of the decompression grids 320aa-320mn may be performed in parallel and/or substantially in parallel. In the step 668, the reconstruction module 264 may reconstruct the reconstructed images 252a-252n at the source bit-depth M. Next, the method 650 may move to the step 670. The step 670 may end the method 650.

Figure 13:
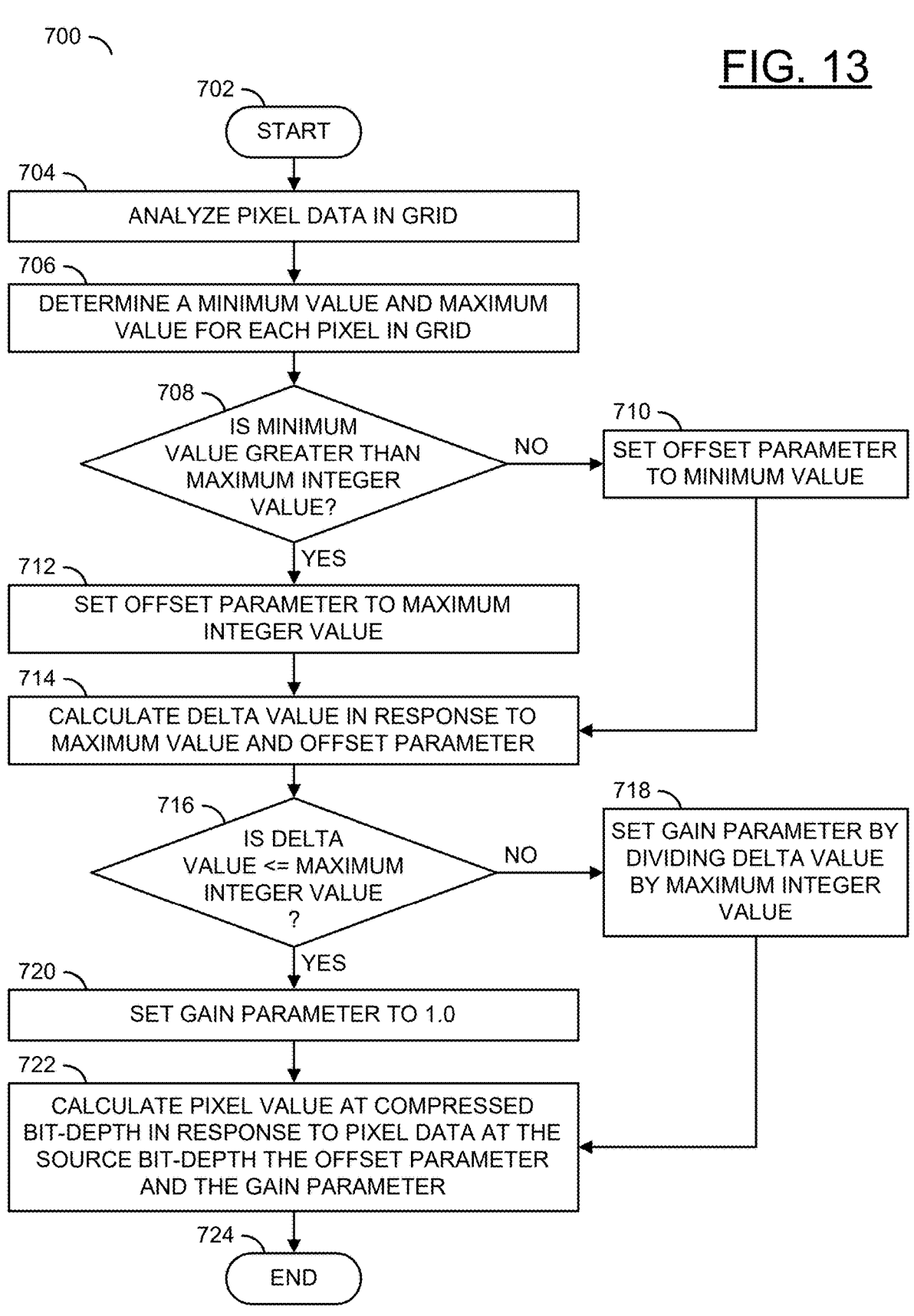
FIG. 13 is a flow diagram illustrating a method for calculating pixel values based on the compression parameters.

Referring to FIG. 13, a method (or process) 700 is shown. The method 700 may calculate pixel values based on the compression parameters. The method 700 generally comprises a step (or state) 702, a step (or state) 704, a step (or state) 706, a decision step (or state) 708, a step (or state) 710, a step (or state) 712, a step (or state) 714, a decision step (or state) 716, a step (or state) 718, a step (or state) 720, a step (or state) 722, and a step (or state) 724.

The step 702 may start the method 700. In the step 704, the compression pipeline 130 may analyze the pixel data in one of the grids 320aa-320mn. Next, in the step 706, the gain/offset compensation module 212 may determine a minimum value and a maximum value for each pixel in the current grid. For example, in a 4×4 grid, the minimum pixel value and the maximum pixel value of the 16 pixels may be determined. Next, the method 700 may move to the decision step 708.

In the decision step 708, the gain/offset compensation module 212 may determine whether the minimum value of the pixel values is greater than the maximum integer value. For example, the maximum integer value may be $2^I-1$, for the compressed bit-depth I. If the minimum value of the pixel values is less than or equal to the maximum integer value, then the method 700 may move to the step 710. In the step 710, the offset parameter for the current one of the grids 320aa-320mn may be set to the minimum pixel value. Next, the method 700 may move to the step 714. In the decision step 708, if the minimum pixel value is greater than the maximum integer value for the compressed bit-depth I, then the method 700 may move to the step 712. In the step 712, the offset parameter for the current one of the grids 320aa-320mn may be set to the maximum integer value. Next, in the step 714, the gain/offset compensation module 212 may calculate a delta value in response to the maximum pixel value and the offset parameter for the current one of the grids 320aa-320mn. For example, the offset parameter may be subtracted from the maximum pixel value. Next, the method 700 may move to the decision step 716.

In the decision step 716, the gain/offset compensation module 212 may determine whether the delta value is less than or equal to the maximum integer value of the compressed bit-depth I. If the delta value is greater than the maximum integer value, then the method 700 may move to the step 718. In the step 718, the gain/offset compensation module 212 may set the gain parameter by dividing the delta value by the maximum integer value (e.g., based on the equation EQ1). Next, the method 700 may move to the step 722. In the decision step 716, if the delta value is less than or equal to the maximum integer value, then the method 700 may move to the step 720. In the step 720, the gain parameter may be set to 1.0 for the current one of the grids 320aa-320mn. Next, the method 700 may move to the step 722.

In the step 722, the gain/offset compensation module 212 may calculate the pixel value at the compressed bit-depth I in response to the pixel data at the source bit-depth M, the offset parameter and the gain parameter for the current one of the grids 320aa-320mn. For example, the compressed pixel value may be determined according to the equation EQ2. Next, the method 700 may move to the step 724. The step 724 may end the method 700.

Figure 14:
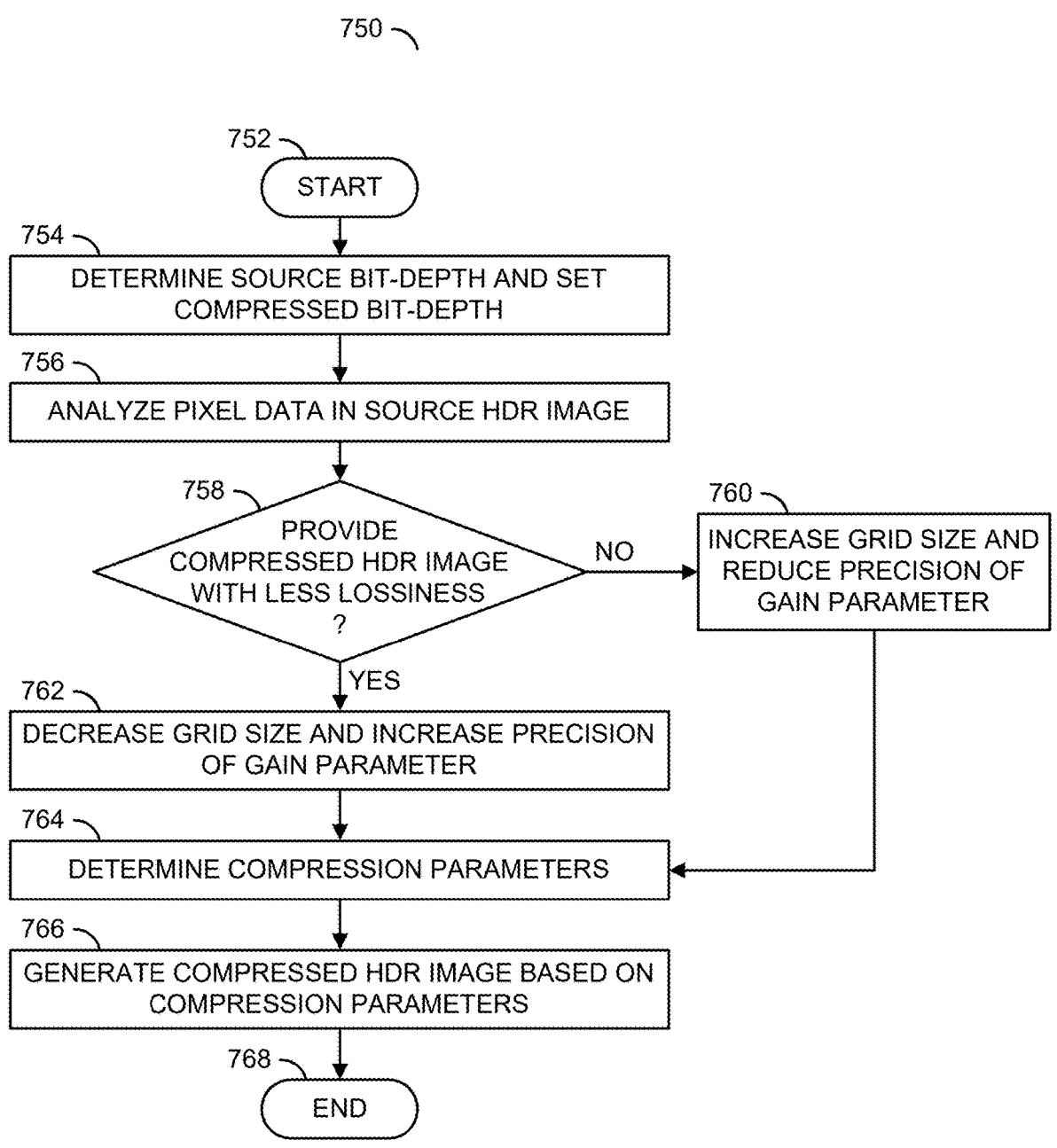
FIG. 14 is a flow diagram illustrating a method for controlling an amount of lossiness for image compression.

Referring to FIG. 14, a method (or process) 750 is shown. The method 750 may control an amount of lossiness for image compression. The method 750 generally comprises a step (or state) 752, a step (or state) 754, a step (or state) 756, a decision step (or state) 758, a step (or state) 760, a step (or state) 762, a step (or state) 764, a step (or state) 766, and a step (or state) 768.

The step 752 may start the method 750. In the step 754, the processor 102 may determine the source bit-depth M and set the compressed bit-depth I. Next, in the step 756, the compression pipeline 130 may analyze the pixel data in the source HDR images 202a-202n. Next, the method 750 may move to the decision step 758.

In the decision step 758, the compression pipeline 130 may determine whether to provide the compressed HDR images 204a-204n with less lossiness. For example, the amount of lossiness may be increased or decreased from a default lossiness value in response to the signal C-RATIO and/or the analysis of the pixel data in the source images 202a-202n. If more lossiness is selected, then the method 750 may move to the step 760. In the step 760, the grid encoding module 210 may increase the grid size and/or reduce a precision of the gain parameter. For example, there may be more lossiness when there are more pixels in each of the grids 320aa-320mn and/or the gain has a lower precision (e.g., lower number of decimal points of a floating point value). Next, the method 750 may move to the step 764.

In the decision step 758, if less lossiness is selected, then the method 750 may move to the step 762. In the step 762, the grid encoding module 210 may decrease the grid size and/or increase a precision of the gain parameter. For example, there may be less lossiness when there are fewer pixels in each of the grids 320aa-320mn and/or the gain has a higher precision (e.g., a higher number of decimal points of a floating point value). Next, the method 750 may move to the step 764.

In the step 764, the compression pipeline 130 may determine the compression parameters. The compression parameters may be determined based on the grid size and/or the precision of the gain parameter. Next, in the step 766, the compression pipeline 130 may generate the compressed HDR images 204a-204n based on the compression parameters. Next, the method 750 may move to the step 768. The step 768 may end the method 750.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a"

may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data arranged as image frames; and
   a processor configured to (i) determine a grid size for a compression operation in response to a source bit-depth and a compressed bit-depth, (ii) divide said image frames into a plurality of grids in response to said grid size, (iii) analyze a statistical distribution of said pixel data for each of said grids to determine a gain parameter and an offset parameter for each of said grids, (iv) selectively apply processing to each of said grids of said image frames in response to said gain parameter and said offset parameter, (v) calculate a value at said compressed bit-depth for each of said pixel data in said grid, (vi) store compression parameters in an image header, and (vii) generate a compressed image frame comprising said image header and said values for said pixel data at said compressed bit-depth, wherein
   (a) said compression parameters comprise said grid size, said source bit-depth and a table comprising said gain parameter and said offset parameter for each of said grids,
   (b) said compression operation generates said compressed image frame by converting said pixel data of said image frames from said source bit-depth to said compressed bit-depth, and
   (c) said compressed bit-depth is less than said source bit-depth.

2. The apparatus according to claim 1, wherein each of said image frames comprise a high-dynamic range image and said compressed image frame comprises a compressed version of said high-dynamic range image.

3. The apparatus according to claim 1, wherein said processor is further configured to perform a decompression operation on said compressed image frame from said compressed bit-depth to said source bit-depth.

4. The apparatus according to claim 3, wherein said decompression operation comprises (i) parsing said grid size and said compressed bit-depth from said image header, (ii) dividing said compressed image frame into a plurality of decompression grids based on said grid size, (iii) loading said gain parameter and said offset parameter for each of said decompression grids from said image header, and (iv) reconstructing said image frames from said values for said pixel data in each of said decompression grids based on said values for said pixel data, said gain parameter and said offset parameter.

5. The apparatus according to claim 3, wherein said processor is configured to achieve a high compression ratio for said compressed image frame while maintaining a fidelity of decompressed data after said decompression operation.

6. The apparatus according to claim 1, wherein said grid size comprises an equal width and height.

7. The apparatus according to claim 1, wherein said grid size is calculated based on a tradeoff of a compression ratio against (i) an amount of data for representing said compression parameters in said image header and (ii) a system complexity for performing said compression operation.

8. The apparatus according to claim 1, wherein said statistical distribution of said pixel data is configured to determine a presentation of said pixel data to enable compact storage and reliable data recovery.

9. The apparatus according to claim 1, wherein said compression operation is configured to preserve an integrity of original data of said image frames.

10. The apparatus according to claim 1, wherein (i) said compression operation enables a lossy compression and (ii) an amount of loss from said compression operation corresponds to said grid size and a precision of said gain parameter.

11. The apparatus according to claim 1, wherein said image frames are represented using said source bit-depth of 20 bits or greater and said compressed image frame is represented using said compressed bit-depth of 12 bits.

12. The apparatus according to claim 1, wherein said compression operation comprises a grid-based quantization aware compression.

13. The apparatus according to claim 1, wherein said compressed bit-depth is determined in response to analyzing each of said pixel data in one of said grids in real time and adopting a minimum number of bits for pixel representation.

14. The apparatus according to claim 1, wherein said compressed bit-depth is determined in response to analyzing a pixel distribution of said image frames offline.

15. The apparatus according to claim 1, wherein said gain parameter and said offset parameter for each of said grids reduce redundant data in said image frames while preserving critical details.

16. The apparatus according to claim 1, wherein said compression operation are adjusted according to characteristics of said statistical distribution of each of said grids of said image frames to prevent over-compression and over-expansion.

17. The apparatus according to claim 1, wherein said value at said compressed bit-depth for each of said pixel data in one of said grids is determined in response to (i) determining a minimum value and a maximum value for each of said pixel data in said one of said grids, (ii) determining said offset parameter based on said compressed bit-depth and said minimum value, (iii) calculating a delta value in response to said maximum value and said offset parameter, (iv) determining said gain parameter in response to said delta value and said compressed bit-depth and (v) calculating said value with said compressed bit-depth in response to said pixel data, said offset parameter and said gain parameter.

18. The apparatus according to claim 17, wherein said offset parameter is (i) a maximum integer value for said compressed bit-depth if said minimum value is greater than said maximum integer value for said compressed bit-depth and (ii) said minimum value if said minimum value is not greater than said maximum integer value for said compressed bit-depth.

19. The apparatus according to claim 17, wherein (i) said delta value is calculated by subtracting said offset parameter from said maximum value and (ii) said gain parameter is (a) unity if said delta value is less than or equal to a maximum integer value for said compressed bit-depth and (b) said delta value divided by said maximum integer value for said compressed bit-depth if said delta value is greater than said maximum integer value for said compressed bit-depth.

20. The apparatus according to claim 17, wherein said value with said compressed bit-depth is calculated by subtracting said offset parameter from a value of said pixel data at said source bit-depth and then dividing by said gain parameter.

* * * * *